US010981541B2

(12) United States Patent
Golduber

(10) Patent No.: US 10,981,541 B2
(45) Date of Patent: Apr. 20, 2021

(54) SYSTEM AND METHODS FOR VEHICLE SHARING

(71) Applicant: Phrame, Inc., San Francisco, CA (US)

(72) Inventor: Gary Golduber, San Francisco, CA (US)

(73) Assignee: Phrame, Inc., San Francisco, CA (US)

( * ) Notice: Subject to any disclaimer, the term of this patent is extended or adjusted under 35 U.S.C. 154(b) by 0 days.

(21) Appl. No.: 16/271,629

(22) Filed: Feb. 8, 2019

(65) Prior Publication Data

US 2019/0241155 A1 Aug. 8, 2019

Related U.S. Application Data

(63) Continuation of application No. 15/575,936, filed as application No. PCT/US2016/037063 on Jun. 10, 2016, now Pat. No. 10,308,218.

(Continued)

(51) Int. Cl.
*B60R 25/24* (2013.01)
*G06Q 10/02* (2012.01)
(Continued)

(52) U.S. Cl.
CPC .......... *B60R 25/24* (2013.01); *B60R 13/105* (2013.01); *B60R 25/102* (2013.01);
(Continued)

(58) Field of Classification Search
None
See application file for complete search history.

(56) References Cited

U.S. PATENT DOCUMENTS

| 4,182,062 A | 1/1980 | Krokos et al. |
| 5,528,998 A | 6/1996 | Smith |

(Continued)

FOREIGN PATENT DOCUMENTS

| WO | 2014137427 A1 | 9/2014 |
| WO | 2015042650 A1 | 4/2015 |

OTHER PUBLICATIONS

Car2go, How to use car2go—Use the app to begin a rental, Jun. 14, 2016, https://www.youtube.com/watch?v=tjX5IVAqQcs (Year: 2016).*

(Continued)

*Primary Examiner* — Carlos Garcia
(74) *Attorney, Agent, or Firm* — John C. Merchant

(57) ABSTRACT

A system, apparatus and method for secure vehicle sharing comprising a computerized client device in the form of a mountable vehicle license plate frame (SLPF) 117 enabled for wireless communication and connection to a wide area network 101 including a server 103. The SLPF 117 device has a processor with an instance of the software 105 executing from memory thereon, Global Positioning System (GPS) capability, power source, and a locking key compartment. The SLPF 117 device may be easily mounted, after market, to the vehicles of registered vehicle owners 107. The server may track time of use, vehicle mileage and vehicle location while the vehicle renter is operating the vehicle. Upon completion of vehicle use, the renter replaces the key or other item in the locking compartment, sends notification of completion of use to the server which then completes a financial transaction between the renter and owner.

19 Claims, 10 Drawing Sheets

Related U.S. Application Data

(60) Provisional application No. 62/174,808, filed on Jun. 12, 2015.

(51) Int. Cl.

| | | |
|---|---|---|
| *G06Q 30/06* | (2012.01) | |
| *G07B 15/00* | (2011.01) | |
| *B60R 13/10* | (2006.01) | |
| *B60R 25/10* | (2013.01) | |
| *B60R 25/102* | (2013.01) | |
| *B60R 25/104* | (2013.01) | |
| *B60R 25/33* | (2013.01) | |
| *G07C 9/00* | (2020.01) | |

(52) U.S. Cl.
CPC ........ *B60R 25/104* (2013.01); *B60R 25/1009* (2013.01); *B60R 25/33* (2013.01); *G06Q 10/02* (2013.01); *G06Q 30/0645* (2013.01); *G07B 15/00* (2013.01); *B60R 2325/101* (2013.01); *B60R 2325/103* (2013.01); *B60R 2325/205* (2013.01); *G07C 2009/00936* (2013.01)

(56) References Cited

U.S. PATENT DOCUMENTS

| | | | |
|---|---|---|---|
| 5,563,579 A | 10/1996 | Carter | |
| 5,947,038 A | 9/1999 | Smith | |
| 5,979,339 A | 11/1999 | Smith | |
| 6,611,232 B1 | 8/2003 | Wunderlich et al. | |
| 7,271,701 B2 | 9/2007 | Kokubu et al. | |
| 7,366,677 B1 | 4/2008 | Liu et al. | |
| 7,761,062 B2 | 7/2010 | Mervine | |
| 7,866,071 B1 | 1/2011 | Downey | |
| 8,370,268 B2 | 2/2013 | Ehrman et al. | |
| 8,671,063 B2 | 3/2014 | Ehrman et al. | |
| 8,768,565 B2 * | 7/2014 | Jefferies | G07B 15/00 701/32.7 |
| 8,841,987 B1 * | 9/2014 | Stanfield | G07C 9/00857 340/5.61 |
| 9,483,886 B2 * | 11/2016 | Bergerhoff | G07C 9/00007 |
| 9,911,255 B2 * | 3/2018 | Lee | G07C 9/00007 |
| 2003/0158761 A1 | 8/2003 | Johnston | |
| 2003/0179075 A1 | 9/2003 | Greenman | |
| 2004/0073440 A1 | 4/2004 | Garbers et al. | |
| 2004/0112099 A1 | 6/2004 | Randall | |
| 2005/0206502 A1 | 9/2005 | Bemitz | |
| 2005/0248484 A1 | 11/2005 | Stoschek et al. | |
| 2006/0049945 A1 * | 3/2006 | Tanaka | B60R 13/10 340/572.1 |
| 2006/0061456 A1 * | 3/2006 | Tanaka | B60R 11/02 340/425.5 |
| 2007/0273534 A1 | 11/2007 | McGinn et al. | |
| 2008/0079551 A1 | 4/2008 | Blanchet et al. | |
| 2008/0252415 A1 | 10/2008 | Larson et al. | |
| 2009/0150306 A1 | 6/2009 | Campbell | |
| 2009/0219135 A1 | 9/2009 | Harvey et al. | |
| 2010/0114616 A1 | 5/2010 | Touati | |
| 2011/0022422 A1 | 1/2011 | Taylor | |
| 2011/0191126 A1 | 8/2011 | Hampshire et al. | |
| 2011/0313937 A1 | 12/2011 | Moore, Jr. et al. | |
| 2012/0330696 A1 | 12/2012 | Clark et al. | |
| 2013/0106572 A1 | 5/2013 | McGinn et al. | |
| 2013/0321178 A1 | 12/2013 | Jameel et al. | |
| 2013/0325521 A1 | 12/2013 | Jameel et al. | |
| 2014/0156111 A1 | 6/2014 | Ehrman | |
| 2014/0250953 A1 | 9/2014 | Briggs et al. | |
| 2014/0278599 A1 | 9/2014 | Reh et al. | |
| 2014/0278607 A1 | 9/2014 | Johnson et al. | |
| 2014/0278608 A1 | 9/2014 | Johnson et al. | |
| 2014/0309842 A1 | 10/2014 | Jefferies et al. | |
| 2015/0019304 A1 | 1/2015 | Vakili | |
| 2016/0055699 A1 * | 2/2016 | Vincenti | G07C 9/00309 340/5.61 |
| 2016/0093216 A1 * | 3/2016 | Lee | G07C 5/02 340/870.11 |

OTHER PUBLICATIONS

European Application No. 16808464.8, Office Action dated Dec. 13, 2019, 10 pages.

* cited by examiner

SYSTEM AND METHODS FOR VEHICLE SHARING

CROSS-REFERENCE TO RELATED DOCUMENTS

The present invention claims priority to a U.S. application Ser. No. 15/575,936 filed on Nov. 21, 2017 which is a 371 of international patent PCT/US2016/037063 filed Jun. 10, 2016 and claims priority to provisional patent application Ser. No. 62/174,808 filed on Jun. 12, 2015 and entitled Smart License Plate Frame System Apparatus and Method for Auto Sharing the disclosure of which is included herein at least by reference.

TECHNICAL FIELD

The present invention is in the field of electronic communications including network-hosted communications and pertains particularly to methods and apparatus for communicating availability of and enabling access to a vehicle for rented or shared use.

BACKGROUND ART

Recent developments in the car rental market include business models to facilitate personal car rental activity known as car sharing between private individuals, for example, a car owner providing the vehicle to a user who needs the car for a specified period of time. Other developments include car sharing models used by commercial rental and leasing companies. Customers that patronize a car sharing network typically includes those customers that may have an "occasional" need for a vehicle but do not own a vehicle and those customers who own a vehicle but would like to have use of a vehicle of a different type such as for a special event, occasion, or circumstance.

Existing car sharing networks are prolific and include businesses such as Autolib', City Car Club, Greenwheels, JustShareIt, Stadtmobil, GoCar, Zoom, OpenFleet, and Zipcar. Likewise, traditional car rental companies such as Hertz, Avis, Enterprise, and U-Haul rent and share vehicles. There are also cooperatives operating car share services where a club, company, or group of individuals owns the vehicle to be shared.

One challenge with current car sharing networks is that a host system, typically based on a communications network, is charged with providing an exact and repeatedly used "pickup" location for a vehicle to be shared such as at a vehicle parking spot in a designated parking area. One issue with this approach is that patrons don't always bring the vehicle back to the exact same location and the designated locations may not always be available when the renter returns. Authorized access to a shared vehicle is typically accomplished through provision of a "keyless" car entry code to access the vehicle where the key is left somewhere inside the vehicle. In some current models, a third party receptionist may be required to pick up and drop off keys for shared vehicles so as not to have them left in the vehicle when it is unattended.

Furthermore, many car share models are challenged by the occurrence of "unscheduled events" such as vehicle accidents or maintenance problems or when a prior renter does not return the vehicle on time that may make a vehicle scheduled for sharing suddenly unavailable. Limits to service are also evident such as facilitating multiple car renters (more than one) to "share" a specific rental contract where the vehicle is shared amongst them during portions of the entire rental period.

Therefore, what is clearly needed in the art is a vehicle sharing system that overcomes the problems mentioned above and that provides services that current models do not include.

SUMMARY OF THE INVENTION

A system, apparatus and method for secure vehicle sharing is described and shown. The system includes a computerized server connected to a wide area network (WAN), the server executing software, having a user interface, and accessible on the WAN. Users register as a vehicle owner or as a vehicle renter with the server and upload user profile data to a database accessible to the server, including at least identification and financial data. The system further comprises a computerized client device in the form of a mountable vehicle license plate frame or smart license plate frame (SLPF) enabled for wireless communication and connection to the WAN, the SLPF storing and executing an instance of the software from memory. The SLPF has a mobile computerized security housing including a front surface, a back surface for securely mounting on an outside surface of the vehicle, a top, bottom, right and left sides, an antenna for receiving wireless signals and enabling wireless communication and tracking including near field communication (NFC), short-wave signals (such as BlueTooth), cellular network signals (GSM), and positioning system signals (GPS). The SLPF has a processor with an instance of the software executing from memory thereon, Global Positioning System (GPS) capability, power source, and a locking compartment. The SLPF may be easily mounted, after market, to the vehicles of registered vehicle owners. The server receiving a request from a registered vehicle renter to rent a vehicle accesses the database and matches the renters request to at least one registered vehicle owner with an available vehicle including the SLPF within a specified geographic location specified by the vehicle renter and sends results of the matching to the vehicle renter's personal wireless communications device (which may be a smart phone or, in some instances may be a laptop or some other computerized device) to select a vehicle causing the server to send the vehicle renter location data (including GPS data) enabling the vehicle renter to locate the selected vehicle, and security data to enable the vehicle renter to unlock the locking compartment of the housing and remove a key or other item to operate the vehicle. The server tracks at least time, vehicle mileage and vehicle location while the vehicle renter is operating the vehicle. Upon completion of vehicle use, the vehicle renter replaces the key or other item in the locking compartment, sends notification of completion of use to the server and the server completes a financial transaction between the vehicle renter and the vehicle owner.

DETAILED DESCRIPTION OF THE INVENTION

In various embodiments described in enabling detail herein, the inventor provides a unique system and service that enables users to rent out or share their vehicles in a manner not requiring third party assistance or requiring a renter and owner to meet face-to-face. The present invention is described using the following examples, which may describe more than one relevant embodiment falling within the scope of the invention.

Figure 1:
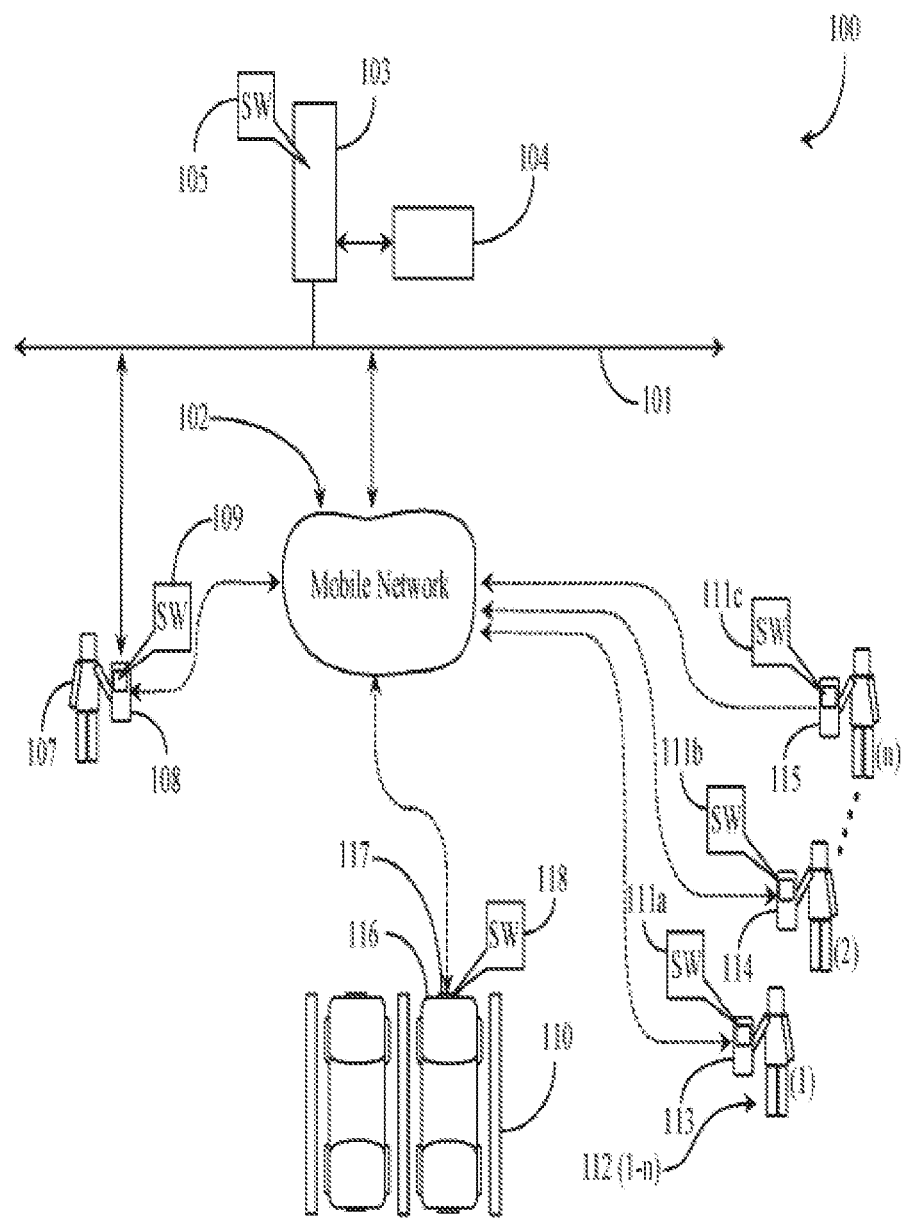
FIG. 1 is an architectural overview of a communications network supporting car sharing according to an embodiment of the present invention.

FIG. 1 is an architectural overview of a communications network 100 supporting vehicle sharing according to an embodiment of the present invention. Communications network 100 includes a data communications network depicted herein by a network backbone 101. Network backbone 101 may include that of an Internet or Intranet network. Network backbone 101 may include all of the lines, equipment, and access points making up the Internet network including connected sub-networks. Therefore, there are no geographical limits to the practice of the present invention. In another embodiment, backbone 101 may represent a wide area network (WAN), a municipal area network (MAN), or a local area network (LAN) without departing from the spirit and scope of the present invention. In FIG. 1, the WAN is connected with a Mobile Network which may be considered part of the extended WAN.

For the purposes of discussion, backbone 101 represents an Internet backbone and supports a network server 103. Network server 103 may be maintained by a first party service provider (SP) that may provide an apparatus, referring to a mobile computerized security housing which, in this case, is in the form of a vehicle license frame and referred to herein as a "smart license plate frame" or "SLPF" 117 with a locking key compartment, and a vehicle sharing brokering service (network based). Network 101 may be accessed via interfaces, nodes and routers, as is known in the art. Network server 103 may be adapted to host a vehicle share brokering web service that may be accessible to users through a web page, via the Internet, or mobile application, via a mobile carrier network, enabling users to subscribe to the service. Server 103 may also host software (SW) 105. Software 105 may be adapted to manage transactions between users of the service. Service users may include vehicle "owners" of vehicles equipped with a registered SLPF 117 such as an owner 107 of a vehicle depicted herein as vehicle 116 parked in a parking spot 110. Service users also include vehicle "renters" such as potential vehicle renters 112 (1-n) depicted herein. It is noted herein that a vehicle owner may rent vehicles in addition to renting out a vehicle or vehicles. In other words, owners in some circumstances may also be renters and vice versa.

SW 105 may be adapted to register users to the vehicle sharing service of the invention. Registration may also include requiring users, such as renters or owners, to download a mobile software application to their personal wireless communications devices (for example, the user's smart phone) for enabling both owners and renters to interact with the system from mobile locations. In this example, an owner 107 has a personal wireless communications device 108 hosting a mobile software application 109. It is presumed in this example that owner 107 is the owner of vehicle 116 parked in parking spot 110. SLPF 117 is, in this example, a mobile computerized client device in the form of a mountable vehicle license plate frame which is easily mountable, after market, to the vehicle and which holds a mounted license plate of the vehicle. While the mobile computerized client device 117 may in some embodiments be an aftermarket easily mountable form which does not house a vehicle license plate, for purposes of this description the mobile computerized client device 117 is in the form of a vehicle license plate frame and is therefore referred to herein as a "smart license plate frame" 'or SLPF.

SLPF 117 may include a power source, a processor, a memory for storing data, and a wireless modem or transceiver for detecting and communicating with other wirelessly enabled communications devices such as device 108 of owner 107. In this example, a wireless network 102 represents a mobile communications carrier network enabling mobile device communication between devices 108, 113-115, 117 and server 103. The mobile communications carrier network may include any known mobile communication standard, for example, Global System for mobile Communications (GSM) and Code Division Multiple Access (CDMA). SLPF 117 may also be a network node having an IP address or mac address and may communicate with server 103 through the Internet. In alternative examples, device 108, 113, 114, and 115 may communication with SLPF 117 directly using short range or near-field communication methods (such as through Bluetooth or NFC). It is noted herein that backbone 101 represents all of the lines, equipment, and network access points that make up the WAN network, which may be the Internet network and that mobile network 102 represents any wireless carrier network including relays, towers, and other like equipment used to receive and send communications and data. One with skill in the art will appreciate that mobile network 102 connects with and is therefore an extension of the WAN. Also, one will appreciate that communications from mobile devices may pass through bridging equipment available in network 102 and or on backbone 101 including through data hubs, routers, communications bridging nodes, and the like.

SLPF 117 may include a lockable "key" compartment wherein a vehicle key used to start or at least access vehicle 116 may be inserted by an owner intending to rent the vehicle to a potential renter. In some embodiments, the key compartment may store an electronic key fob (FOB) used for activating remote keyless entry systems. SLPF 117 may include global positioning system (GPS) location reporting capability so that vehicle 116 may be tracked by the service of the invention from server 103. SLPF 117 may include an antenna for receiving wireless and short range communications signals, GSM or other cellular signals and GPS signals. It is also assumed herein that mobile communications devices 108 (owner), and mobile communications devices 113, 114, and 115 (potential renters 112 (1-*n*) are GPS enabled as is typical for smart phones and similar wireless communications devices. In one embodiment of the system, the GPS location of the vehicle is stored on the mobile communication device of the user once the distance between the user's mobile communication device and the SLPF 117 is no longer immediately proximate, for example, when the mobile communications device is moved beyond 5-7 ft. from the SLPF 117. This lack of immediate proximity causes the short wave or near field communication signal to become weaker indicating that the user has left the vehicle at a particular stopping location. In some embodiments where the SLPF 117 has its own GPS, the SLPF 117 will store the location of the vehicle on its own memory.

SLPF 117 may host a resident software (SW) application 118. SW 118 may be adapted for various tasks including communicating with various electronic sensors of varying types and combinations thereof that may be incorporated into SLPF 117 and or into vehicle 116. In some embodiments, the SW 118 is adapted for communication with an accelerometer (such as a 3× accelerometer) which measures movement and acceleration as well as other vibrations which might indicate events (such as tampering with the SLPF, unauthorized moving of the vehicle or collision with the vehicle). In some embodiments, SW 118 is adapted for communication with one or more sensors which may detect the presence of an article within the key compartment. SW 118 may communicate current status for example, "compartment locked/unlocked" and "key present/not present". In some embodiments, the SW 118 is adapted to accept changes in status of the vehicle. In some embodiments, for example, the owner 107 may use a personal communications device to communicate with the SW 118 to change the status regarding the vehicles availability to renters. SW 118 may also communicate unfolding events during an active rental period through real time analysis of data received from various sensors. For example, SW 118 may receive signals from the accelerometer or other sensor indicating tampering or movement in which case SW 118 may cause notifications to be sent to one or more users. SW 118 may be adapted to aid in communication between SLPF 117 and owner 107 and one or more of renters 112 (1-*n*) in provision of secure wireless transfer of data state and device state from the SLPF 117 to a user and compartment access codes from the users to the SLPF 117. SLPF 117 may include a motor for driving certain mechanisms and or actuators to "lock" and to "unlock" a key compartment in the SLPF where a vehicle key may be either inserted into or removed therefrom.

Accordingly, in one embodiment of the present invention the service involves registration of users such as "owners" and "renters". Registration may be conducted through a Web interface hosted on server 103 or via downloaded and installed application interface. Registration for a vehicle owner may be conducted at the time of purchase or mounting of an SLPF on a vehicle, or at some later time by following a provided link to server 103. Server 103 includes a data repository 104 for holding data. Repository 104 may contain user profile data taken from users during registration. Registration of an SLPF owner may include all required vehicle information relative to the vehicle that will host the SLPF.

In one embodiment, one owner may control more than one SLPF (each different SLPF mounted to a separate vehicle) and may provide a set of data identifying each vehicle hosting an SLPF. During registration the owner 107 is paired (securely associated with) with at least one SLPF 117 that is mounted to the vehicle 116. Paring generally means associating a user such as an owner with a specific SLPF 117 by registering one or more personal communications devices (such as smart phones or other computerized mobile client devices) with mobile application stored thereon which device is used by the owner to communicate with that particular SLPF 117. Once paired, the unique identification data of the associated SPLF 117 is provided to and stored on the personal communication device of the owner. In some embodiments, the owner is paired automatically upon registration of a particular SLPF 117. In some instances multiple owner personal communication devices may be associated with a single SLPF 117 and in some instances a single personal communication device of the owner may be associated with multiple SLPFs registered to the owner. Renters are only associated with a particular SLPF 117 temporarily utilizing the renter's personal communication device (such as a smartphone or other computerized mobile client device) and the mobile application stored thereon while the renter is using (or assigned to use) the vehicle. The pairing of the renter's personal communication device with the selected SLPF 117 occurs automatically when the renter's device is in communication range of the selected SLPF. User data may include profile data, contact data, payment/account data, vehicle data (owner), and calendar data (projected). Users may be required to authenticate with the service before they are able to use the service. In one embodiment the system considers location of owners and potential renters when filling a request from either an owner to rent a vehicle or from a renter looking for a vehicle to rent.

In general use of the present invention, an owner having registered with the service may send a request to server 103 to find one or more potential renters to rent a vehicle for typically a specified period of time. However, an owner such as owner 107 may also rent a vehicle out for an unspecified period of time (renter determined) without departing from the spirit and scope of the present invention. All of the required vehicle and owner information is available to server 103 in repository 104. At the time of the request or some time thereafter, owner 107 may insert a key to start vehicle 116 into a locking key compartment housed by the SLPF 117 aided by SW 118. The owner may have an access code downloaded to a personal communications device 108, which with the aid of SW 109 may be communicated to the SLPF 117 through a wireless transceiver or modem to unlock and/or open the key compartment. Owner 107 may then lock the compartment after inserting the key therein. It should be noted that for purposes of this description the devices described herein as the "personal communications device" of the owner or renter would include a smartphone or other computerized mobile client device capable executing instances of software stored in memory and communication using a mobile wireless network, GSM, or through short wave or near field communication.

Server 103 aided by SW 105 searches for requests from registered renters to match an owner's request. In one embodiment, the owner changes the status of the vehicle to be "available" for rent and the system looks for potential renters having live open requests to rent a vehicle. The system may use GPS location coordinates of potential renters and of the vehicle to match closest pairs first as geography may be an important factor affecting whether an agreement is feasible or not. Alternatively, some other factor may serve as the primary matching factor such as payment type or anticipated driving geography or length as provided by the vehicle renter. In some embodiments, multiple factors or features are considered by the SW 105 in filling an owner or renter request or, in other words, in matching a registered vehicle to a renter request, providing a list or available vehicles for renters to choose from, or otherwise providing one or more renter requests to the owner to allow the owner to choose which renter request is preferred. A variety of methods and factors may be used to match a vehicle with a renter request. In one embodiment, the radius of geographical proximity between the vehicle and potential renters may be adjustable. In one embodiment, the requested geographical location is not based on current proximity between vehicle and renter but rather on the intended proximity of the renter at a future time, for example, a location proximate to where the renter is intending to travel to at some point in the future. The owner request contains the terms of the rental agreement that a potential renter must agree to before being directed to the location of vehicle 116. In some cases, a negotiation may occur between the owner and one or more potential renters to more particularly define the terms of the rental agreement.

Assuming one of renters 112 (1-*n*) is selected as the qualified renter filling the owner request, server 103 may send a message to the renter with confirmation of the agreement and location of the rental vehicle to the renter's personal communications device. Once a renter, for example renter 112(1), is geographically close to the vehicle, server 103 may send a compartment access code or signal to personal communications device 113 aided by SW 111*a*. Renter 112(1) may then communicate the access code to SLPF 117 unlocking the key compartment of the SLPF.

A short range wireless technology, such as Bluetooth or near field communications (NFC), may be used to transfer lock and unlock commands between the personal communications devices of the owner and renter and the SLPF 117. SLPF 117 may detect the personal communications device of the renter or owner when brought into range of the wireless communications field. In one implementation, server 103 may send an unlock command to SLPF 117 through a router or communication node 106 (not shown) that is part of the mobile network 102 such as over a GSM network when the user has located the vehicle and sends a message to server 103 that the renter is ready to move the vehicle. In another implementation, a Wi-Fi hotspot (WFHS) powered through an On Board Diagnostic port (OBD) installed within the vehicle communicates with SLPF 117 via Wi-Fi protocol, while WFHS communicates with the server 103 via GSM. In one embodiment the server 103 may back up the renter such as making sure the compartment was locked by the renter after replacing the key into the compartment. There are many and variant options for locking and unlocking the key compartment of the SLPF 117.

A wireless technology such as Bluetooth, or near field communications (NFC) may be used to transfer lock and unlock commands between the personal communications devices of the owner and renter and the SLPF 117. SLPF 117 may detect the mobile communications client device of the renter or owner when brought into range of the wireless communications field. In an alternative embodiment, the SPLF 117 may communicate with the vehicle's On Board Diagnostics (OBD) system via a hardwired or wireless interface (such as through a plug in Wi-Fi hot spot device) in inserted into the vehicle's existing OBD port (not shown) enabling the server, owner or renter to control the vehicle, thereby locking, unlocking and operating vehicles that function "keyless" via lock sensors and push button engine start and stops. In another embodiment, the SLPF 117 communicates with the personal communications devices of the owner and renter through the Wi-Fi connection enabled by a Wi-Fi hot spot device utilizing the vehicle's OBD system as a power source.

In one embodiment, when an owner and one or more renters are grouped around an active rental contract or agreement, communications between the server, SLPF, and the personal communication device(s) of the renter(s) may be copied to the owner's personal communications device (108) aided by SW 109. During an active rental period, vehicle 116 is being driven and may be tracked by server 103 aided by SW 105. SW 105 may periodically check GPS coordinates of vehicle 116 and compare the data to geographic data associated with a rental agreement such as to enable server 103 to determine if a renter has moved a vehicle beyond an agreed area or locality. Likewise, a renter may drop off vehicle 116 at another location which the server may discover and inform the owner.

Server 103 may monitor certain states of operation of vehicle 116 by a renter such as user 112(1). SW 105 may be adapted to receive data reported to it from SLPF 117 during use such as vehicle speed, vehicle location, vehicle operating temperatures, outside air temperature, vehicle park locations and lock state, etc. This data may be collected by designated sensors on the SPLF 117 or via connection to the OBD system, as previously described. Server 103 may have access to rules created by an owner and associated with a particular rental agreement that the server may use to determine (typically through sensor data) that the renter has violated a condition of a standing rental agreement. In such a case the server may send a communication to the renter copying the owner to alert the renter of the violation such as driving outside the intended course or area, driving too fast, or driving beyond a stated boundary line. The server may also send alerts or messages to third party entities like a police department, fire department or other first responding unit or service if an event is detected that warrants it such as an accident or obvious theft. For example, and as described later in this application, the SLPF 117 may detect an incident through one or more sensors such as that the SLPF 117 is being tampered with or the vehicle is being moved without the presence of the vehicle renter in which case the SLPF 117 may send alerts to the owner, renter or third parties through boosted short range communication such as Bluetooth or otherwise utilize GSM or Wi-Fi communications technology enabled by a Wi-Fi hotspot to notify the server of the incident which in turn the server then notifies the owner, renter or third parties such as police.

SW 105 may broker rental transactions between users including providing a payment mechanism, tracking revenue, and other similar tasks. As the system is used for example, in a local setting, the system may discover geographic patterns or areas where renters are conjugating and inform owners about benefits of leaving a rental car closer to the discovered area. An owner may, through application 109, access recorded data and statistics about service use, account settings, etc. More detail about SLPF 117 is provided in the following description.

Figure 2:
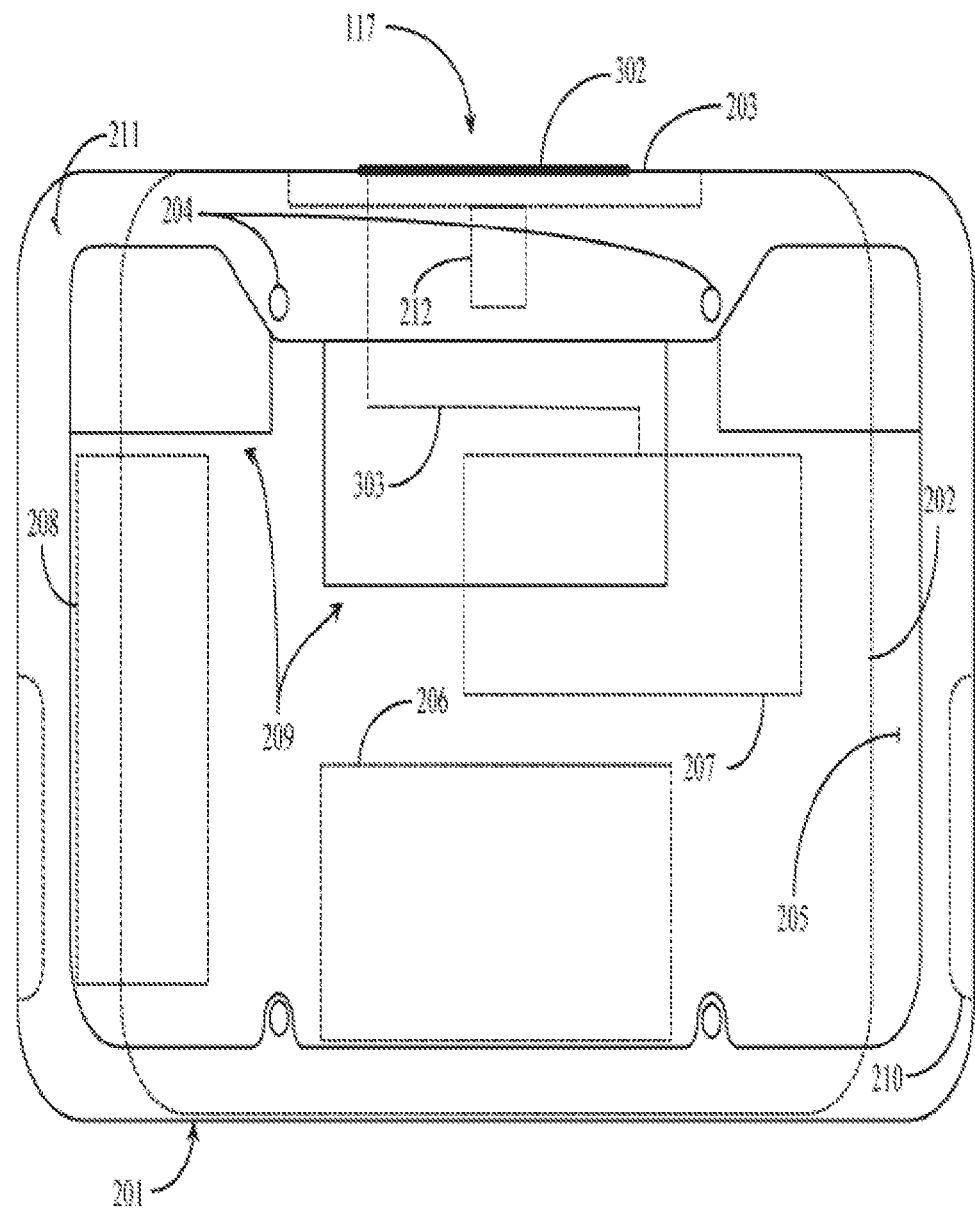
FIG. 2 is a front elevation view of a smart license plate frame (SLPF) according to an embodiment of the present invention.

FIG. 2 is a front elevation view of smart license plate frame (SLPF) 117 according to an embodiment of the present invention. SLPF 117 is adapted as a smart computing and communications device that also functions to hold a traditional license plate. SLPF 117 may include mechanisms and actuators that may be motor driven and electronically triggered. SLPF 117 includes a body portion having a length, a width, and a depth sufficient to include one or more pockets or compartments for housing electronics, mechanics, and an on-board (OB) power source. The body portion of SPLF 117 may be manufactured or molded from a durable and resilient polymer material. In one embodiment, the body portion of SLPF 117 may be machined of aluminum, or another durable and weather resistant metal such as stainless steel. Weight may be a factor in material selection. The body portion of SLPF 117 may include additional open pockets or space for mounting electrical and mechanical components, memory card, and sensors such that they are not occupying the key compartment space.

SLPF 117 is adapted to be mounted onto a vehicle frame or bumper section using a bolt system enabling a user to install SLPF 117 onto a vehicle in place of a traditional license plate holding device. SLPF 117 includes a body front door assembly 201. Body front door 201 may include a hinged support plate 202 having a hinge 203 positioned at the top front of the body portion of SLPF 117. A license plate mounting frame 211 (two pieces) may be mounted to back support plate 202 at screw mounting points 204 following a rectangular bolt pattern. License plate 205 rests between opposing members of mounting frame 211 against the hinged support plate.

Hinged support plate 202 may be manufactured of a durable and resilient polymer material or of a metal such as aluminum, stainless steel, or the like. It is important to note herein that durability of materials and resistive properties of the materials to adverse weather conditions may play a role in material selection for fabrication of the components of the SLPF 117 of the invention without departing from the spirit and scope of the present invention. Behind hinge 203, there may be a hinge mounting plate that may be installed at the top central edge of the SLPF body portion.

License plate 205 includes the typical license plate indentations demarcating regions for registration stickers etc. License plate holding frame 211 may be manufactured in essentially the same specifications as standard plate holders are manufactured to without departing from the spirit and scope of the present invention. Body front door 201 may swing out toward a user when opened and may include a latch not illustrated to latch it closed. In one embodiment, door lift recesses 210 may be provided on the body portion of SLPF 117 that break out to surface under the body front door 201. These recesses enable a user to lift open the body front door more easily. Recesses 210 may extend past the radii of the bottom of the frame. In one embodiment body front door 201 may be locked when closed and may be unlocked by a code or signal to enable manual opening using recesses 210.

A rectangular motherboard compartment 207 is provided within the body portion of SLPF 117 having a length, a width, and a depth sufficient to house a computing motherboard including a central processing unit (CPU) and other electronics components such as a components enabling wireless communication with other wirelessly enabled communications devices like those personal communications devices described above relative to FIG. 1, and for establishing data connection to a data network-hosted server such as server 103 of FIG. 1.

In the embodiment shown, an antenna 302 in the form of a mountable strip is provided and is mounted front center at the top of the SLPF 117 body. In an alternative embodiment, the antenna 302 is an embedded strip inside of frame 211. In one embodiment, antenna 302 is adapted to detect Bluetooth and NFC signals as well as GSM and GPS signals. In one embodiment there will be several antennas, each tailored for respective function including Bluetooth, GSM, NFC and GPS which may be mounted or embedded together or separately on the SLPF 117 body or frame 211. In this example antenna 302 has power and signal connection 303 to motherboard compartment 207. In one embodiment, antenna 302, designed for Bluetooth frequency is known to the inventor and has been manufactured according to instruction from the inventor by a company referred to herein as World Products part number WPANT10088-S2A.

A rectangular battery compartment 208 is provided having a length, a width, and a depth sufficient to hold one or more regular or rechargeable batteries and/or cells. Rechargeable batteries or cells may be charged manually, through a charging connection to a vehicle charging system, or by solar charging using a solar plate array or panel positioned to have exposure to the sun. In the case of regular batteries or cells, for example off the shelf AA or AAA batteries, these will be easily replaceable. In one embodiment, the software will detect that battery power level is at a critical level and will alert the user to change or recharge the batteries.

SLPF 117 includes a rectangular locking key compartment 206 having a length, a width, and a depth sufficient to store at least one key that may be used to start the host vehicle. In one embodiment one or more than one key and perhaps other small items such as instructions may be kept securely within compartment 206. Two keys may include such as one to start the host vehicle and one to access the trunk of the vehicle, or two starter keys for two drivers, etc. Compartment 206 may also house an electronically triggered door lock mechanism (such as an electronic key FOB, not illustrated), and at least one presence detection sensor for sensing key presence within compartment 206. In one embodiment of the invention the compartment 206 is made of a material such as metal that creates a Faraday Cage deterring unauthorized individuals from using wireless signals to determine whether an electronic key is contained within the compartment and access the codes contained thereon to access the vehicle.

Compartments 206, 207 and 208 are interconnected via physical pathways sufficient to provide for inter-component wiring and electronic bus connections for power distribution and for electronic motor and door control (locking or unlocking). Actual wiring is not illustrated herein so as not to obscure the details of the invention. In one implementation, SLPF 117 may include a USB connection that may be used to connect the device directly to a laptop computer or other test or diagnostic devices for the purposes of mechanically unlocking the key compartment, data management, configuration, software update, or diagnostic maintenance procedures. In one embodiment, the USB may only be utilized to open the lock if batteries are depleted and all upgrades and testing of the SLPF 117 may be completed through short wave or other wireless communication with the SLPF 117. A torsion spring 212 is provided top center of the frame body for tensioning the license plate frame assembly (front door) for latching purposes.

Figure 3:
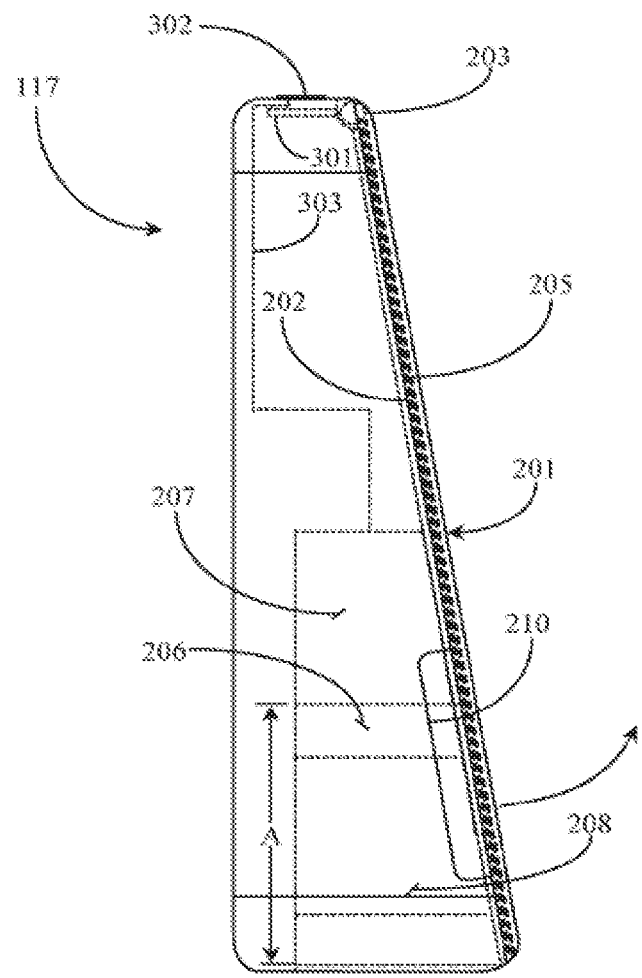
FIG. 3 is a side elevation view of the SLPF of FIG. 2.

FIG. 3 is a side elevation view of SLPF 117 of FIG. 2. SLPF 117 has an angular profile such as that of a vertically oriented right triangle wider at the base and narrower at the top. This should not be construed as a limitation of the invention as other profiles may be observed. In this example, the angular profile may provide for a more vertical presentation of the mounted license plate when SLPF 117 is mounted to a vehicle frame or bumper.

Frame front door 201 may be mounted to the top surface of the body portion of frame 117 via a hinge mounting plate 301 connected to hinge 203, in turn connected to back support plate 202. License plate 205 is mounted to the support plate in this example. In one embodiment a latch mechanism may be provided that includes a physical actuator for latching and releasing the door. In this example a user may lift front door 201 by inserting fingers under the door in the area of door lift recesses 210. Frame front door 201 swings out in the direction of the arrow. In one embodiment magnets are used to hold down front door 201.

In one embodiment frame front door 201 may be latched and locked and unlocked electronically in a fashion described relative to the key compartment door. In one implementation a single access code may be used to "unlock" both the frame front door and the key compartment door simultaneously. In another example, frame front door 201 latches but is not "locked" in the latched position. In still another embodiment, front frame door 201 does not latch but stays down due to magnetic latch components. In this view compartments 206, 207, and 208 have overlapping vertical boundaries. A width dimension "A" depicts the width footprint of key compartment 206. In one embodiment, as previously discussed, the key compartment has "shielding" from electronic signals by method of magnetic shielding such as a Faraday Cage surrounding the key compartment or material lining to prevent thieves from using a scanner to locate an electronic key (such as an electronic key FOB) stored within the key compartment and obtaining any digital code which may be stored within the electronic key itself to unlock a door or otherwise access any portion of the vehicle.

In this view antenna 302 in the form of a mountable strip is provided and is mounted front center at the exterior top body portion of the SLPF 117. Antenna 302 is adapted to detect Bluetooth and NFC signals as well as GSM and GPS signals. In this example antenna 302 has power and signal connection 303 to motherboard compartment 207. Antenna 302 is known to the inventor and has been manufactured according to instruction from the inventor by a company referred to herein as World Products part number WPANT10088-S2A.

In one embodiment, all sensors deemed important to operation of SLPF 117 may be installed within SLPF 117 (body or compartments) and may be operated independently of any host vehicle components or systems. Sensors may include visual or optical sensors (camera, photocell), audio sensors (microphone), vibrational, shock, or other motion sensors such as accelerometers, and object presence sensors such as a sensor for determining key presence within compartment 206 and a sensor for determining the locked or unlocked state of the key compartment door. In one embodiment, an accelerometer, such as a 3× accelerometer, is used to detect vibration, shock and or motion that would indicate an event such as tampering or unauthorized use and send a signal to the CPU which would enable an alert system which may activate an alarm such as a buzzer or speaker mounted on the SLPF 117 or to send an alert message directly to the owner, renter or third party located within a proximate vicinity via boosted signal such as a boosted Bluetooth signal. In one embodiment, a speaker is positioned within the SLPF 117 and the software would enable a user, alerted by the system that an event is occurring, to activate an alarm or buzzer using the software installed on the user's communication device. In one embodiment, the alarm or buzzer would be automatically activated upon an event and an alert provided to the user who may deactive the alarm or buzzer. In one embodiment, the SLPF 117 is put in a ready or "armed" mode either manually by the user using the application stored his personal communication device or automatically when the user (carrying a personal communication device paired with the SLPF) moves a distance away from the SLPF 117 as to weaken the communication signal such that the system determines the user has left the proximate vicinity of the vehicle (for example, 5-8 feet). Once "armed" any detection by the accelerometer or other sensors indicating movement or tampering causes the CPU to boost power and send an amplified Bluetooth or other signal to the personal communication device of user located well beyond the normal short wave distance (as much as 500 feet for example). In an alternative embodiment, the SLPF 117 itself may have GSM or other mobile communications capability in which case it could communicate with the user, server or third party via GSM. In another alternative embodiment, the SLPF 117 is in communication with a server via a Wi-Fi hotspot connected with an OBD system of the vehicle enabling the SLPF 117 to communicate with the server that an event is taking place and alert the user or other parties through GSM.

In one implementation, SLPF 117 may have electronic connections made (during installation) to specific sensors that may be installed in the host vehicle and may take data from those sensors during operation, and relay that information to the owner, renter or server. SLPF 117 may also have a power connection to a host-vehicle charging system including any solar charging apparatus that may be installed on the host vehicle. An example of such an embodiment may be one where the SLPF comes as a feature in a new vehicle being sold. An aftermarket SLPF may be connected to specific vehicle components or systems by a mechanic or by the user with aid of a manual.

As previously discussed, one implementation includes the SLPF 117 having access to a Wi-Fi network through components installed in the host vehicle as a feature of the vehicle. In one implementation, access to a Wi-Fi router installed in and powered by the vehicle may be through communication by the SLPF with the server via Wi-Fi host system connected with the vehicle on board diagnostic (OBD) system or other Wi-Fi host system or component that may be part of the OEM features of the vehicle. Likewise, SLPF 117 may be integrated to vehicle-based network communications or reporting systems like On Star™ or similar reporting or emergency systems without departing from the spirit and scope of the present invention.

In one implementation SLPF 117 is a standalone unit and does not require electronic or power connections to the host vehicle. For example, a solar powered charging system may be made part of the SLPF to keep batteries in charged state. In such an implementation, SLPF 117 may be removed easily from one host vehicle and mounted to a different host vehicle. An owner may then add the new vehicle particulars to the profile data relative to vehicle description and identification including a new plate number.

Telephony capability for wireless messaging using any available network may also be provided so that the system does not require vehicle based components to communicate such as with a server on the Internet or to an emergency number reached over the telephone carrier network. In yet another variation of telephony capability, SLPF 117 may be adapted to use a mobile computerized communication device such as smart phone as a modem to access a data network such as the Internet network and communicate with a server such as server 103 of FIG. 1.

Figure 4:
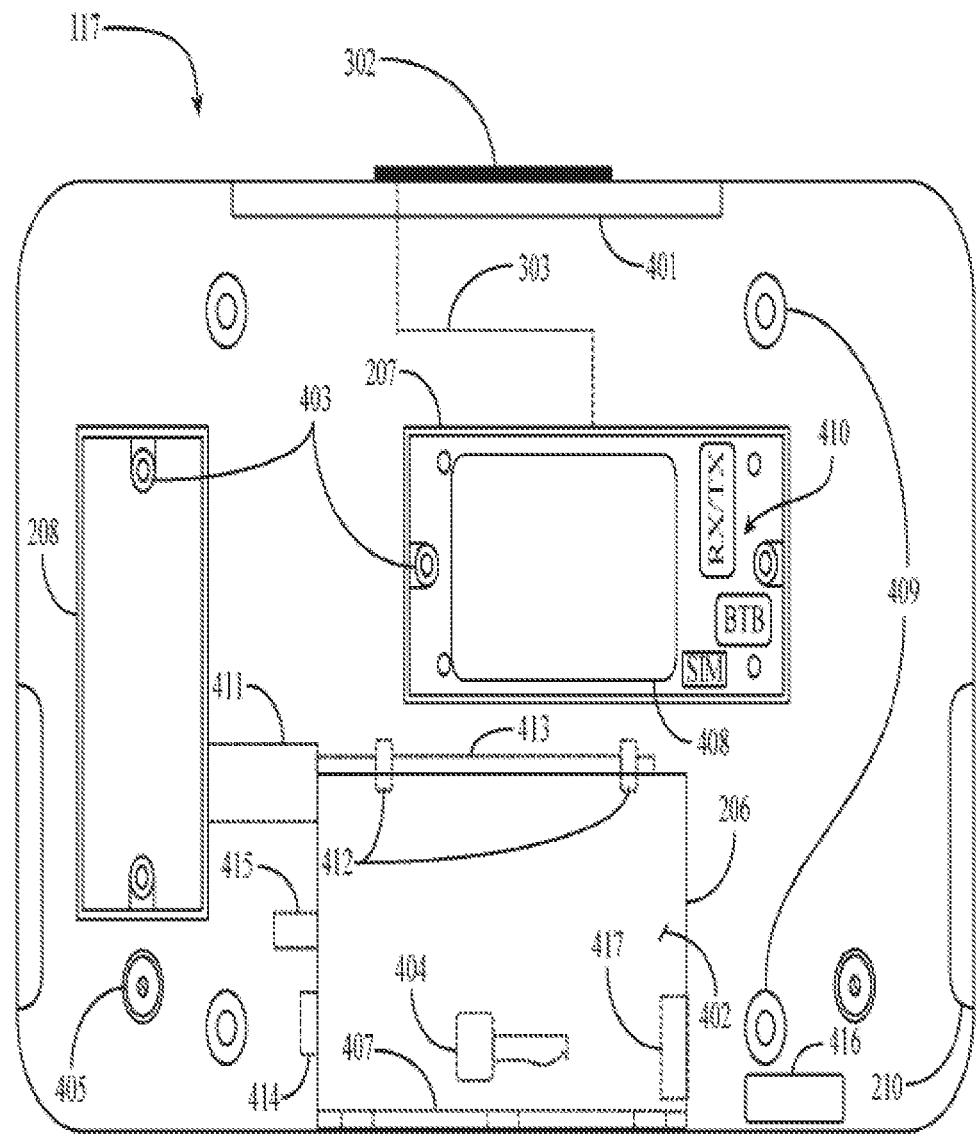
FIG. 4 is a front elevation view of the SPLF of FIG. 2 with the frame door and license plate removed.

FIG. 4 is a front elevation view of SPLF 117 of FIG. 2 with the frame door and license plate removed. Battery compartment 208 is adapted to hold rechargeable batteries or power cells. Compartment 208 includes a pair of cover mounts 403 for mounting a battery compartment cover plate (cover not illustrated). Motherboard compartment 207 also has cover mounts 403 adapted to screw mount a cover plate there over (cover plate not illustrated). In this example, a computing motherboard including a central processor unit (CPU) 408 is depicted mounted within compartment 207 along with other electronic components 410.

Components 410 may include memory for storing firmware, data, and executable SW such as SW 118 of FIG. 1. Components 410 may also include a wireless near field communications circuitry and or an NFC card slot adapted for reading or taking data from NFC cards inserted therein. Alternatively, an antenna installed on the outside surface of the SLPF may be used to pick up NFC card signals when an NFC card is placed close to the antenna. For example, if the business model for the SLPF is to use the system to track employees, the employees may be issued special NFC cards to access the key compartment of the SLPF to insert or remove a key. An NFC card slot or antenna may be presented at a convenient position on the outside surface of SLPF 117 such as adjacent to the key compartment door.

In one embodiment, an antenna 302 in the form of a mountable strip is provided and is mounted front center at the top of frame 117. Antenna 302 is adapted to detect Bluetooth and NFC signals as well as GSM and GPS signals. In this example antenna 302 has power and signal connection 303 to motherboard compartment 207. Antenna 302 is known to the inventor and has been manufactured according to instruction from the inventor by a company referred to herein as World Products part number WPANT10088-S2A.

Components 410 may include a Bluetooth chip or other wireless communications circuitry for enabling detection and communications with nearby devices detected within range. In this example, a Bluetooth Booster (BTB) module is included in components 410 and is adapted to boost a Bluetooth signal range beyond the standard 25 or so foot perimeter to upwards of 500 feet.

A signal booster may reach a user's personal device in the larger vicinity of the vehicle should the service require a communication with the user during rental of a vehicle. For example, if the SLPF is tampered with while the user is not in the vehicle the user might be alerted along with other third parties such as local authorities if needed. Likewise, a SLPF may be enabled to access a local wireless network such as a GSM network or Wi-Fi network.

Motion sensor 417, such as a 3× accelerometer, could, if triggered, cause the BTB module 410 to activate to boost the communications range of the SLPF to 500 feet (perimeter). Also in this example, components 410 include a flexible transceiver antenna (RX/TX for cellular, CDMA, etc.) communications. In a minimal embodiment, SLPF 117 uses the capabilities of a user's personal communications device to gauge location or to communicate with a server using the personal device as a portal or modem to the server. In one embodiment, the alerts showing tampering could be sent to multiple users who have registered for the service and are known by the system to be within the vicinity of the subject vehicle but are not necessarily paired with that vehicle. Such alerts might tell this "community of users" that there is a vehicle known by the system that is signaling an alert and show the location of the vehicle so that one or more members of the community might respond and provide communication back to the server via the system application stored on their personal communication device.

Components 410 may include one or more circuits supporting one or more accessible ports such as a universal serial port (USB), an audio/visual jack, or the like. Such port interfaces may be presented on the outside of SLPF 117 in convenient plug-in locations. Components 410 may include a subscriber identity/identification module (SIM) card adapted to provide 3G or 4G network access and adapted to store unique identification and key compartment access information for at least the owner of the SLPF 117.

SLPF 117 includes mounting points 409, which may be bolt mount openings for mounting SLPF 117 to a frame or bumper plate of a vehicle. Element 401 is an elongate recess in the body wall of SLPF 117 to accept the hinge associated with the frame front door support plate. Key compartment 206 has, in this implementation, a hinged door 402 supported by hinge 407. Hinge 407 may, in one embodiment, be spring assisted to urge door 402 open when in an unlocked state. An electric motor 411 is provided within the frame body portion of SPLF 117 that has rotatable connection to a cam shaft 413 with a pair of cam lock apertures 412 that may be operated through the motor to lock or unlock door 402. In one embodiment, server 103 may send an unlock command to SLPF 117 by direct communication when a designated renter or owner is within range of the wireless communications field. The SLPF may receive the signal or other communication from either the server or personal communication device at an antenna coupled with the CPU. The antenna is capable of communicating with any number of wireless communication protocol including NFC, BluTeeth, GSM and GPS. The processor may access a local memory, or the server in order to validate that the signal was received from a trusted subscriber device having authority as the owner or an approved renter to open the key compartment of the SLPF, prior to locking or unlocking the key door of SLPF 117. If the received signal is determined valid, the processor may signal a switch or Frequency Obtained Binary (FOB) sensor to move the motor 411 to either lock or unlock the key door 402.

Key compartment 206 may include within or may provide access to one or more electronically controlled sensors such as a door "state" sensor 415 adapted for determining and reporting whether the key compartment door 402 is locked or is unlocked. Key compartment 206 may include one or more electronically controlled sensors such as a FOB presence sensor 414 adapted to determine whether or not there is actually one or more keys such as key 404 inside of compartment 206. In one embodiment, photoelectric sensors might be used to determine key presence. In one embodiment, weight sensors or magnetic sensors might be used to detect the presence of a key or keys.

In one embodiment, key presence detection granularity of one or more sensors may determine the type of more than one key that might be placed into the compartment. For example, an optical or photo sensor programed with the identifiable key shape patterns of more than one key may determine, for example, an ignition key from a trunk key for the vehicle, and perhaps if a wrong key is placed into the compartment for the process being executed at the time. For example, it might cause an alert message to be sent to an owner or to a renter who has left a "wrong" type of key in the key compartment or whether the "trunk" key should also be included with the ignition key, etc. In one implementation, a motion/shock sensor 416 may be provided either within key compartment 206 or in another convenient location on SLPF 117 such as in the body portion of SLPF 117, the sensor adapted to detect efforts to physically tamper with the SLPF and to record instances of shock such as a collision with another vehicle or shock caused by someone trying to break into the key compartment 206. In one embodiment one or more accelerometers such as 3× accelerometers known to the inventor might be used to detect motion.

It is noted herein that two or more sensors may be utilized in combination to detect a certain event at the time of occurrence. For example, a motion sensor may be activated by someone trying to tamper with the SLPF whereby the motion sensor may trigger the other sensors such as a camera and microphone in order to capture the unfolding incident for reporting purposes. Additionally, an audible alarm may alert passersby that someone is attempting to tamper with the SLPF and/or an alert can be sent automatically to the server and the owner who may, in turn, use a personal communication device to cause the SLPF to sound a buzzer or alarm located on the SLPF. In one embodiment, SLPF 117 includes magnetic hold downs or "latches" that hold front door (201 not illustrated) down whether a latch is also provided for the front door or not.

In general use of the invention, an owner may send a unique code or signal to SLPF 117 via a personal communications device, which may include wearable devices such as a "smart watch" for example when such a device is brought within wireless communications in range, or the code or signal may be sent to the unit by a server in order to open the key compartment for insertion or removal of one or more keys depending on the immediate process relative to car sharing that is being executed. In most embodiments, SLPF 117 wireless component recognizes when an authorized "paired" personal communications device comes into communications range. In the case of a renter the renter's personal communications device is registered with the service and an SLPF may automatically recognize the personal communications device when it comes into proximate range.

The user of the device may then communicate to the frame component either directly or brokered through a network or a combination of both. For example, a renter may only be provided an access code from a server when the SLPF has identified the renters registered personal communications device running the mobile application of the present invention within the wireless range of the vehicle that is to be picked up during that period in time. In one implementation, the renter must request that the server unlock the key compartment and inform the renter when to open the front door to access the key compartment. In some cases, there may be a discrepancy causing the server to withhold the access code such as if a microphone detects a rental violation such as a crowd of people using the vehicle instead of a stated (or agreed maximum) number of persons.

In one implementation, the renter must authenticate by real time video or picture to the server and prove he or she is actually the renter and not a user who has perhaps followed the potential renter with an idea to take the phone running the app from the renter by force and hijack the vehicle. There are a variety of security steps or measures that may take place before the server will allow a key compartment to be unlocked. The vehicle owner may also be subject to authentication with the server before being able to access the key compartment. More detail about using the car sharing service of the present invention is provided later in this specification.

Figure 5:
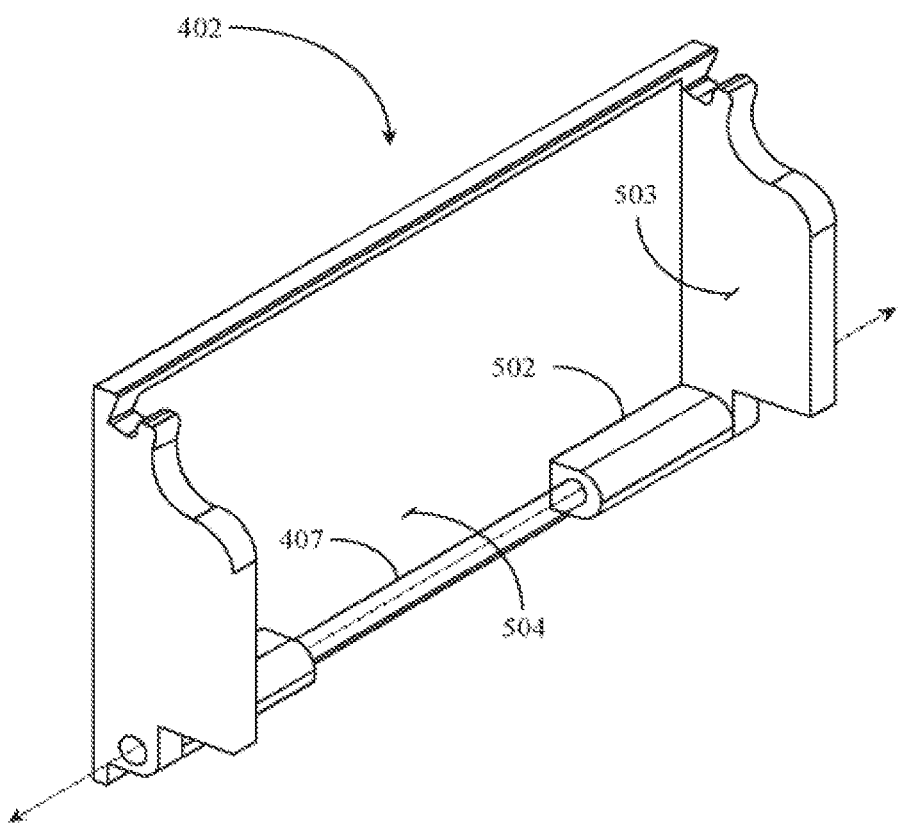
FIG. 5 is a perspective view of a key compartment door for the key compartment of FIG. 4.

FIG. 5 is a perspective view of key compartment door 402 according to an embodiment of the present invention. Key compartment door 402 may be machined of metal such as stainless steel or aluminum. In one embodiment, key compartment door 402 is manufactured of a durable polymer material. In one embodiment, all sides of the key compartment (including the door) are manufactured of a metal or other material that will provide shielding to prevent persons from being able to obtain an entry code from an electronic key or FOB stored within the key compartment. In this example, door 402 includes hinge mounts 502 (one proximal to each end) for mounting door 402 onto hinge component 407 that allows door 402 to swing out about an axis line represented herein by a broken double arrow when unlocked. In one embodiment, a door cam or pinned axle may be substituted for a hinge without departing from the spirit and scope of the present invention. In one embodiment, spring tension such as via a torsion spring may be provided to door 402 to urge the door to swing out under the spring tension whenever it is unlocked.

Key compartment door 402 includes opposing side walls 503 and a front wall or plate 504. The overall length of key compartment door 402 is just shorter than the length of the key compartment as measured from inside wall to opposing inside wall along the direction of the double arrow door axis line. Door 402 may be latched and locked in one embodiment using the previously described cam lock system described relative to FIG. 4. It is noted herein however that other door configurations for key compartment door 402 may be practiced without departing from the spirit and scope of the invention such as using a sliding compartment door instead of a hinged door, for example. It may also be noted herein that other locking hardware might be used in place of cam locks without departing from the spirit and scope of the invention such as electronically controlled pin locks to lock the door closed or a motor/cam axle functioning as the door hinge or axis that may be motor controlled to remain closed and locked, or to unlock and move (via motored) the door opened to an access position sufficient for key insertion and removal.

Figure 6:
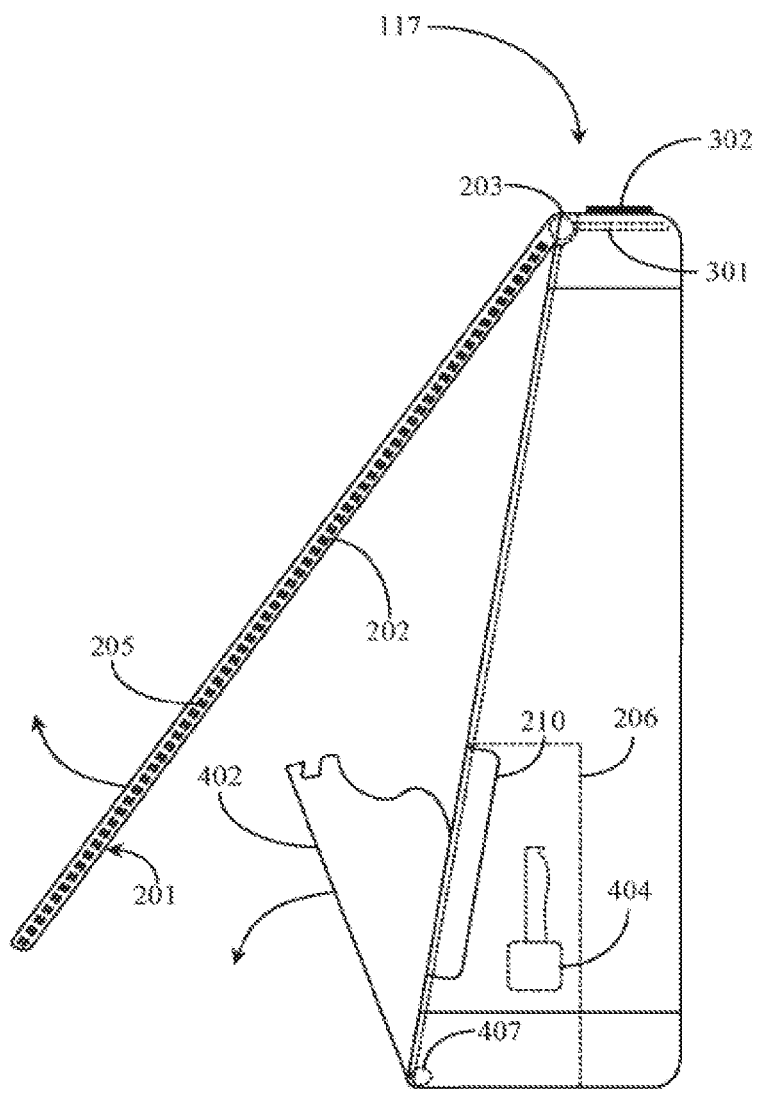
FIG. 6 is a side elevation view depicting the SLPF of FIG. 2 with the frame door and key compartment door open relative to closed or open state.

FIG. 6 is a side elevation view depicting SLPF 117 of FIG. 2 with the frame door and key compartment door open relative to closed or open state. Frame front door 201 is mounted to support plate 202 in the frame front door 201 of SLPF 117. Hinge 203 enables frame front door 201 to be swung out toward an accessing user in the direction of the arrow. License plate 205 and support plate 202 are located within the frame front door assembly 201.

Key compartment door 402 is depicted unlocked and open. Compartment door 402 also swings out about hinge or axle 407 toward the accessing user in the direction of the associated arrow. Vehicle key 404 is depicted (hidden lines) within compartment 206 for reference. In one implementation, a user may open front frame door 201 via door lift recesses 210. Frame front door 201 may be adapted to stay closed via one or more strategically placed magnet latches such as magnets 405 of FIG. 4. In one implementation, frame front door 201 may latch to SLPF 117 and may be locked in a latched state. In this implementation, a wireless code or wireless signal may also be required to unlatch frame front door 201 so that a user may lift it up and out of the way of the underlying key compartment 206. In other words, the embodiment may require two separate unlocking mechanisms—one to unlock the frame front door 201 and one to unlock the key compartment 206.

In one implementation, frame front door 201 is manually lifted and is not locked in a closed position against SLPF 117 but held in a closed position by relatively powerful magnets. In one embodiment, a user desiring to access key compartment 206 for key 404 must send a code or signal to SLPF 117 while within wireless range of a wireless perimeter or range of the SLPF. The code may be a code generated for a particular "car sharing" event set up by an owner of the SLPF. The code may not be shared with the renting user until that user has arrived on scene to pick up the vehicle. The user may be detected by the SLPF when the user brings a registered personal communications device within wireless range of the SLPF. If key compartment door 402 is unlocked it may swing out under spring tension.

If frame front door 201 is closed and compartment 206 is open, the magnets retaining front frame door 201 into the closed position may be powerful enough to also prevent compartment door 402 from popping out though it may be unlocked and accessible. However, when the user lifts front frame door 201, the key compartment door may automatically swing out, if unlocked, as soon as it is no longer obstructed by the front frame door being closed. Key compartment door 402 may only be accessed by a registered user, such as either owner or an approved renter, who has a registered personal communications device in hand or on body that may be detected as such by SLPF 117 and verified at a network server charged with brokering car sharing transactions and monitoring one or more aspects of car share events.

Figure 7:
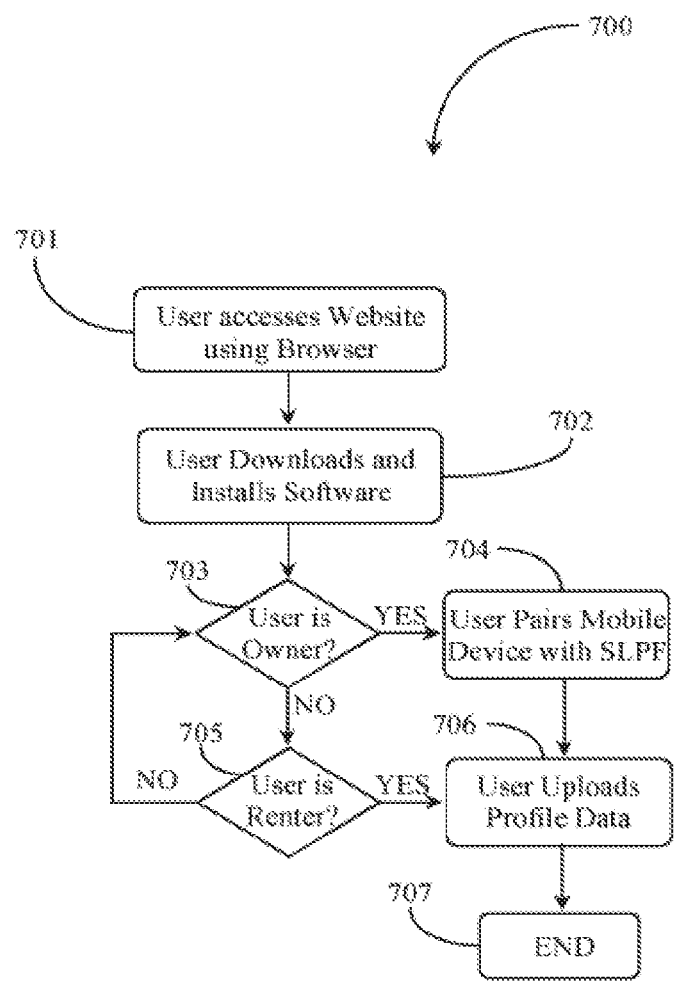
FIG. 7 is a process flow chart depicting steps for registering for a car sharing service according to an aspect of the present invention.

FIG. 7 is a process flow chart 700 depicting steps for registering for a car sharing service according to an aspect of the present invention. At step 701 a user may access a Website set up for vehicle share service registration using a network browser application while connected to the network, for example, the Internet. In one implementation the user may access a registration module using an application (Software) store front, or by using a third party service such as Google Play services. Once at the Website, the user may be prompted to download and install a mobile software application at step 702. The mobile application is adapted for a personal communications device that will be used by the user in communications with the service.

It is noted that step 702 may be part of a general registration process where the user uploads data required by the service to affect registration for that user. In one implementation the application is first downloaded and executed from the user's personal device and then data is uploaded to the server through the application. It is also noted herein that servers may be distributed regionally and one or more servers may overlap relative to service range.

At step 703 it may be determined whether the registering user is in fact an owner of an SLPF such as SLPF 117 of FIG. 1. If at step 703 the user is an owner the process may move to step 704 where the user may pair a personal communications device such as a smart mobile phone or other computerized mobile client device with the purchased SLPF unit at step 704. In this case, registration information may include SLPF data uniquely identifying the unit, personal communications device type and profile data including unique identification, and of course the personal data of the owner. All of this data may be stored in a data repository accessible to the network server. At step 706, a user may upload profile data including car-share vehicle availability calendar information, preferences for lending the vehicle, etc. The registration process may end for that user at step 707.

At step 703 if the user is not an owner of a SLPF 117, then the process moves to step 705 where it may be determined if the registrant is a potential renter. If the server determines the user is not a renter, then the process may loop back to step 703 until the correct information is given. It is noted herein that user profile data uploaded to the server may be later edited by that registered user. If it is determined that the user is a renter at step 705, the process moves to step 706 where the renter may upload a "renter's" data profile. A renter's profile may include the renter's banking data, name and personal information, vehicle types the renter is interested in renting, any references the renter may have, etc. In one case, it is possible that an owner may also be interested in renting as well. To this end the application that users download may be the same app for both owners and renters. The process may end for the renter at step 707. It should be noted, however, that when a selected vehicle is determined and information is provided to the renter to allow the renter to access the key compartment for use of the vehicle, the renter will need to pair his mobile communication device with the SLPF. In both instances of pairing (owner or renter) the pairing may be done automatically by the system.

Figure 8:
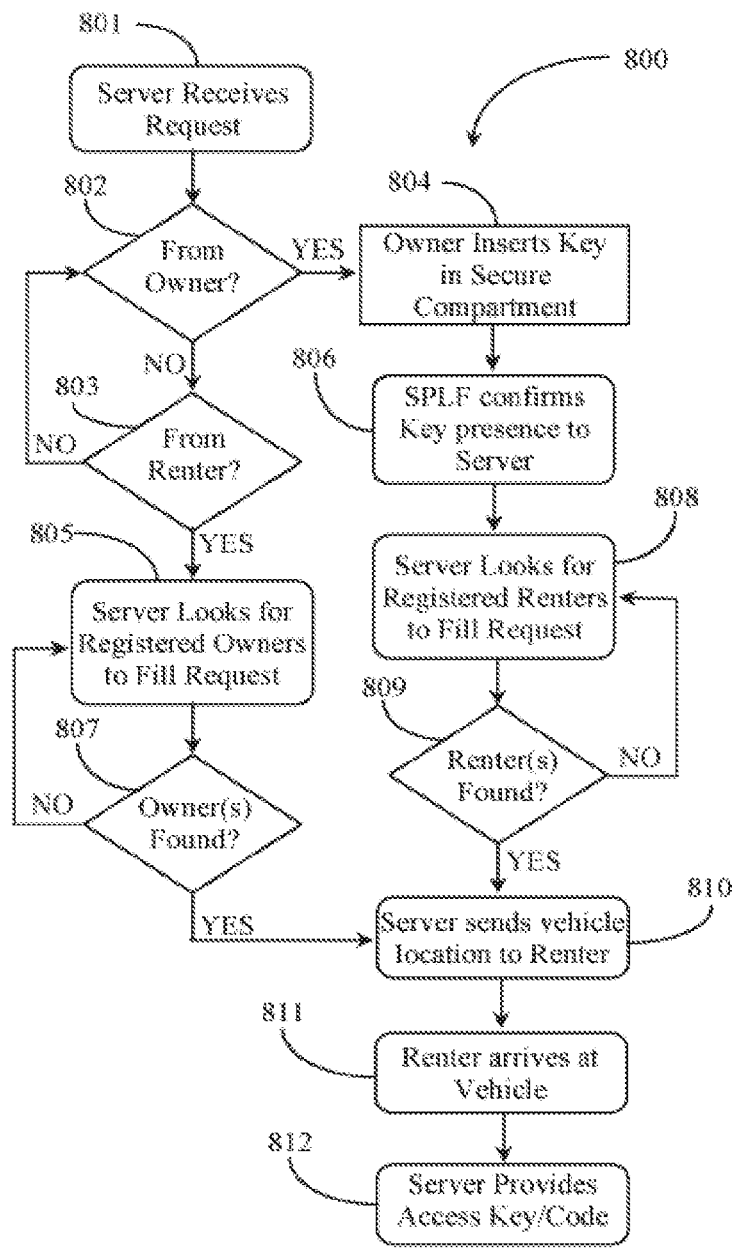
FIG. 8 is a process flow chart depicting steps for brokering a car share transaction in progress according to an aspect of the present invention.

FIG. 8 is a process flow chart 800 depicting steps for brokering a car share transaction in progress according to an aspect of the present invention. At step 801 a network server may receive a request from a registered service user. The request may be from a registered SLPF owner or from a registered renter approved to rent a vehicle. It may be noted herein that the request may be from any registered user owner or renter. The request may include GPS location coordinates of the user's personal communications device and of the SLPF if the request is from an owner whom has been detected within wireless range of the SLPF. At step 802, the server determines if the request received is from an SLPF owner.

If the request is from a SLPF owner and the owner is requesting the service to fulfill a rental availability, the process may move to step 804 where the owner may insert a vehicle key into the key compartment of the SLPF on the vehicle. In this process the owner may physically insert the vehicle key into the key compartment and then send a code from the owner's personal communications device to the SLPF over a short range wireless connection, such as Bluetooth or NFC, in order to lock the key compartment door. The owner may be required to unlock the key compartment door before keys may be physically inserted therein. In another aspect, the compartment is not locked if no keys are present in the compartment.

In one aspect, the code stored on the owner's personal communications device is also stored on the device memory of the SLPF. In this aspect, the owner may insert the key and lock the compartment without server involvement other than authenticating the owner. In one aspect, the server sends a code to the SLPF and to the personal communications device of the owner after it is determined they share the same GPS location. The owner may use the received code to unlock and perhaps lock the key compartment door. In one aspect, the server may require one code to unlock a key compartment and a different code to lock it again. In the above process steps, it is assumed that the owner is located within wireless communications range of the SLPF and that the owner's personal communications device has connection with the server.

At step 806 the presence of the correct key(s) inside the key compartment may be reported to the server from the SLPF through a connection to the network hosting the server. The confirmation may be in the form of a message from the SLPF to the server or a machine to machine network communication such as a ping. Key presence within the key compartment may be determined using one or more sensors adapted to detect one or more keys as previously discussed relative to sensor 414 of the description of FIG. 4.

The server may search for registered renters on behalf of the owner by searching through renter's current status postings or active renter requests identifying them as actively looking to rent a vehicle immediately or in the future. The data may be filtered by the server aided by SW to narrow results to identifying those potential renters that are actively looking to rent the same or similar type vehicle for the stated time period or window and may be within a reasonable geographic distance from the where the vehicle was left by the owner for the renter to pick up.

At step 809 it may be determined whether or not potential renters are found that may qualify to fulfill the car sharing contract of the owner. If no renters were found, the process may loop back until one or more renters can be discovered. If one or more renters are found to fulfill the owners request at step 809, the process may move on to step 810 where the vehicle's exact location information is sent to the renter's personal communications device. This assumes that the renter has accepted the owner's terms and qualifies to rent the vehicle according to owner conditions if any. In one aspect an owner may reserve a right to approve a renter. In another, approval may be automated according to information associated with the rental agreement or contract uploaded by the owner.

In step 811 the renter may arrive at the GPS location of the rental vehicle. It is also assumed that the SLPF of the owner has detected the owner within its wireless range and that the SLPF is also connected to the server. In this process, the SLPF may detect the renter's personal communications device via short range wireless communications. The renter may contact the server and check in to enable the server to confirm GPS of the renter and SLPF to determine if it is appropriate to release an access code to the renter's personal communications device. Once the renter checks in with the server, the server may send the access code to unlock the key compartment at step 812. In one aspect, the server may send the access code directly to the SLPF to unlock the key compartment for the renter with the code being transparent to the renter. In one aspect, each SLPF has to unique codes—one for unlocking the key compartment and one for locking it similar to a key pair.

The access and locking codes or one code for unlocking and locking may be resident on the SLPF, on the network server, and on the owner's personal communications device. In one aspect of the process, the server may assign codes for unlocking and locking a key compartment door of a SLPF for each car sharing event that is to transpire, the codes generated only when immediately needed. In this aspect, the code or codes may be sent to the SLPF to store for subsequent matching to code communicated to the SLPF from the user (owner or renter).

If at step 802 the request is not from a SLPF owner, the server may determine at step 803 if the request is from a renter. If the server determines the request is not from a registered renter, the process may loop back until the nature of the request is determined. If the server determines the request is from a renter at step 803, the process may move to step 805 where the server looks for registered owners to fill the renter's request. A request may be a message specifying a time period within which the renter is wanting a rental and may include data specifying preference for the rental request such as how long the vehicle will be needed, the planned route the vehicle will travel, general purpose statements such as what the vehicle will be undergoing during the rental period as far as distance traveled, loads if any, pets, etc.

At step 807 the server may determine if any owners are found having an available vehicle rental that could fit the needs of the renter. If at step 807 an owner is not found, the process may loop back until an owner is found that can satisfy the renter's criteria. In one aspect there may be some negotiation between an owner and a potential renter before an agreement is forged. If an owner is found in step 807 that is acceptable to the renter and the renter has been approved to share the vehicle by the server or by the owner, the process may move to step 810 where the server sends the vehicle location to the renter. The renter may arrive at the vehicle location at step 811 and the server may then provide the key compartment access code at step 812 once the renter has checked in with the server while at the vehicle location.

It is noted herein that an owner may use the service of the invention to look for potential renters and forge an agreement with a renter to take the vehicle well before the beginning date and time scheduled for renter pick up of the vehicle. In this case, the server may still withhold the access code until the renter is actually ready to access the key compartment and take the vehicle. In one example, an owner may live in one region and a potential renter is traveling to that region by plane and seeks to rent a vehicle after landing in an airport. In this scenario, server will match the renter with an available vehicle in the area near the airport. In this scenario, the owner may also have one or more vehicles available within walking distance from the airport which may be made available to the renter.

The scalability of the service of the present invention is such that it may be practiced internationally using the Internet network as a host network where renters from out of state or country may use the service as registered members of the service to find available vehicles at specified points during their travel without requirement of waiting for service at a conventional vehicle rental service. It is also noted herein that rental transactions may be initiated and brokered "on the fly" such as by an owner who may initiate a new car share event with the service at any point in time where the service immediately finds and matches one or more renters to the owner and vehicle.

In one embodiment of the invention, existing car rental services may collaborate with "local" private vehicle owners to help fulfill car rental demand on their own commercial lots. For example, a client walks in to a commercial establishment that does not currently have the type of vehicle they are seeking to rent. In this case, the service may be invoked to locate private vehicle owners having waiting vehicles parked nearby where if one is found that matches what the renter is willing to take. The owner and rental establishment may share the proceeds appropriately, for example, the owner getting paid for the rental while the car rental company gets a commission and keeps a loyal client.

Figure 9:
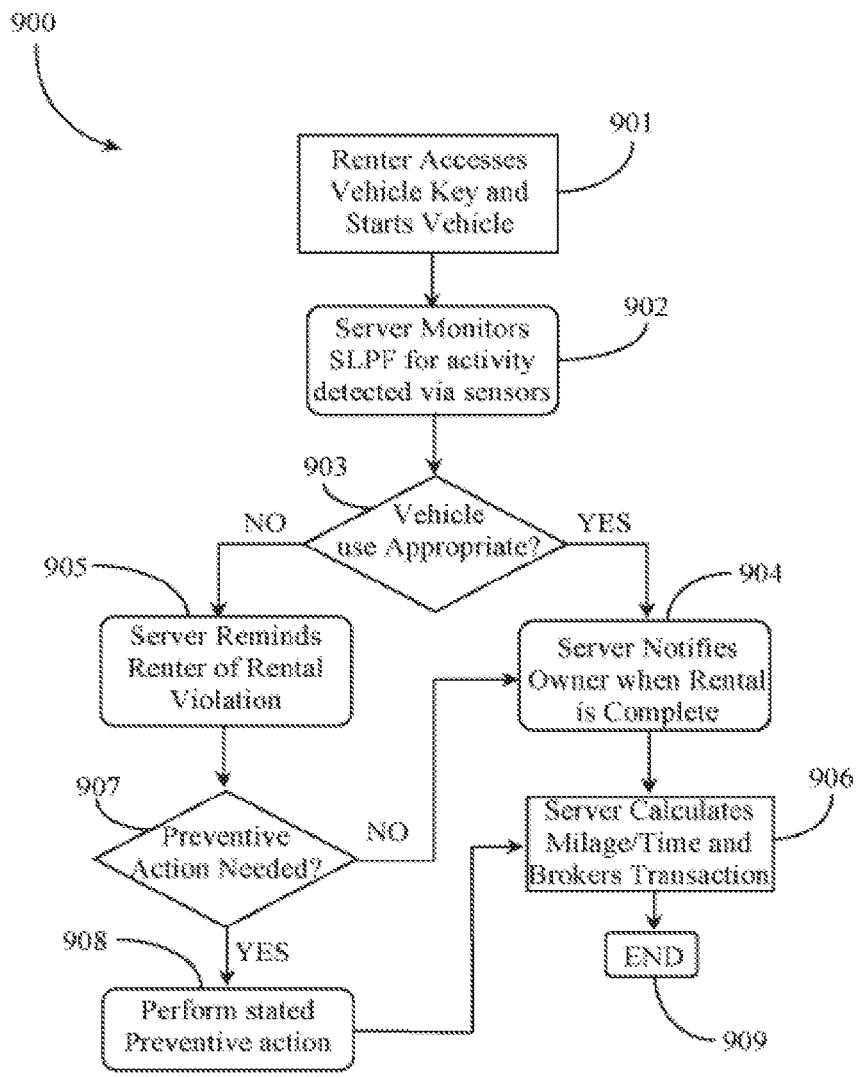
FIG. 9 is a process flow chart depicting steps for monitoring renter activity during a car share event according to an aspect of the present invention.

FIG. 9 is a process flow chart 900 depicting steps for monitoring renter activity during a car share event according to an aspect of the present invention. In this example, it is assumed that the renter has removed the vehicle key from the key compartment with the aid of an access code and has started the vehicle. In this state, the SLPF may retain a network connection at least intermittently with the server in order to update the server relative to vehicle state and activity during use of the vehicle by the renter. In this aspect, the renter may have turned off his personal communications device and may no longer be connected to the server through the mobile application on the device.

At step 902, the server may monitor the rented vehicle via sensors that are operational and on board the SLPF and in some cases in the vehicle but available to the SLPF CPU via wireless or electronic connection. In this process, the SLPF may report periodically to the server or when the SLPF detects something that should be reported based on existing constraints tied to vehicle use under the rental or car share agreement. It is noted herein that in one aspect, SW (118, FIG. 1) loaded on the SLPF may have data downloaded thereto from the server that may include certain rules and constraints for a routine (with for example, periodic check of state of the vehicle during operation) that monitors vehicle condition and use "locally" and reports to the server only in case of a breach of an existing rule or constraint. In another aspect, sensor data may be uploaded to the server for analysis at the server (SW 105, FIG. 1).

At step 903, it may be determined at the server or locally if the vehicle use is appropriate. Step 903 may be executed periodically or through "refresh" to conserve power. If at step 903 it is determined that vehicle use was appropriate, that is to say that the conditions of the agreement between the owner and renter were successfully followed by the renter in terms of use of the vehicle, the process may move to step 904 where the server may notify the owner when the rental is complete and the vehicle has been detected at a drop off location. In this state, the vehicle should be locked and the keys should be locked in the key compartment for the next renter or for the owner.

In one aspect of the invention, an owner may use a mobile cleaning service to go to the vehicle location and access at least a door key in order to make the inside of the vehicle accessible to cleaning. In one embodiment, a mechanic may be called to check on a vehicle that is in the field and waiting for a renter. These third party service personnel may be given the access code by the server at the time they arrive within detection range or in close GPS coordinates to the vehicle in the same fashion as a renter.

After the renter has left the vehicle location and it has been determined that the key is present in a locked key compartment and pending any third party or owner post rental inspection and cleaning of the vehicle, the server may calculate the correct rental fees, including for example the fee associated with the calculated mileage, time of use and brokers transaction fee, at step 906. This process may consider total mileage driven and time of use and any fees for cleaning, etc. Miles driven can be calculated by tracking GPS location of the renter's communication device or GPS of the SPLF 117 during vehicle use, or by connecting a lead on the SLPF to the vehicle odometer, or alternatively via the wireless connection established between the SLPF and a Wi-Fi hotspot installed within the OBD port of the vehicle. The server may take payment from an online renter account and transfer the payment to the owner's account. PayPal or other online payment service may be used. The process may end at step 909.

If it is determined at step 903 anytime during the rental period that the vehicle use is not appropriate, for example, not in line with what is expected in the rental agreement between the owner and renter, the server may attempt to contact or alert the renter's personal communications device at step 905, the alert informing the renter that a violation of the agreement has occurred or is occurring. At step 907, it may be determined whether the violation warrants any preventative action. For example, a rental condition may be a standing rule not to take the vehicle out of state. If a renter drives the vehicle beyond state lines, the server may alert the renter and the renter may adjust accordingly, perhaps having mistakenly taken the vehicle past the state line. Therefore, the server may under certain circumstances give a renter an opportunity to correct a situation before the owner or third party service is engaged, for example, notified by the server about the issue.

If no preventative action is required at step 907, the process may move to step 904 where the server notifies the owner when the rental has expired or is completed. The server may then handle invoicing and payment to the owner in step 906. The process may end for that rental period or session at step 909. However, if preventative action is required at step 907, the server may perform a stated action at step 908. A preventative action might be to contact the owner and a third party such as police services, for example, if it appears that the renter is taking the vehicle for beyond the agreed boundary in the rental agreement.

In one case where there may be damage to the vehicle as a result of renter violation of the rental agreement, the server may have authority to retrieve damages, collect fees or insurance payments and add those charges to the rental payment including deducting additional charges from the renter's account. Therefore, some security may exist regarding renter payment for any mistreatment of the vehicle. For example, the server may have unfettered access to the renter's online account used to register for service and to pay rental fees. The access to the renter's account may be limited to the time the renter is using a rented vehicle.

In one aspect of the method of use, the server may have unfettered access to the owner's online account and may subtract routine fees from the owner's account for such as cleaning, maintaining, gassing up, performing third party diagnostic inspections, or the like. It is possible, for example, that a renter does not leave the rented vehicle with sufficient gas in the tank. In this case, the SLPF may search for and select a third party to take the vehicle to a nearest (or most cost-effective) station for gas or to bring gasoline to the vehicle from a mobile service vehicle. Many of these routine processes may be initiated and brokered relative to transactions by the SLPF and the server without requiring the owner to visit the vehicle location regularly such as to clean and inspect the vehicle immediately after a rental has ended.

In one aspect, an owner may be letting the vehicle out to more than one renter. For example, to a first renter that will drive the vehicle toward a desired destination until that renter no longer needs the vehicle at which time a second renter may take the vehicle from there, and so on. In this case, a mobile vehicle cleaning and inspection may be practiced at each embarking point where a new renter takes over. So in the process it is possible that a renter locks the key compartment for a next renter to open it and retrieve the key for that renter's turn with the vehicle and wherein the owner is not involved until after the last renter has used the vehicle and is finished using it.

Figure 10:
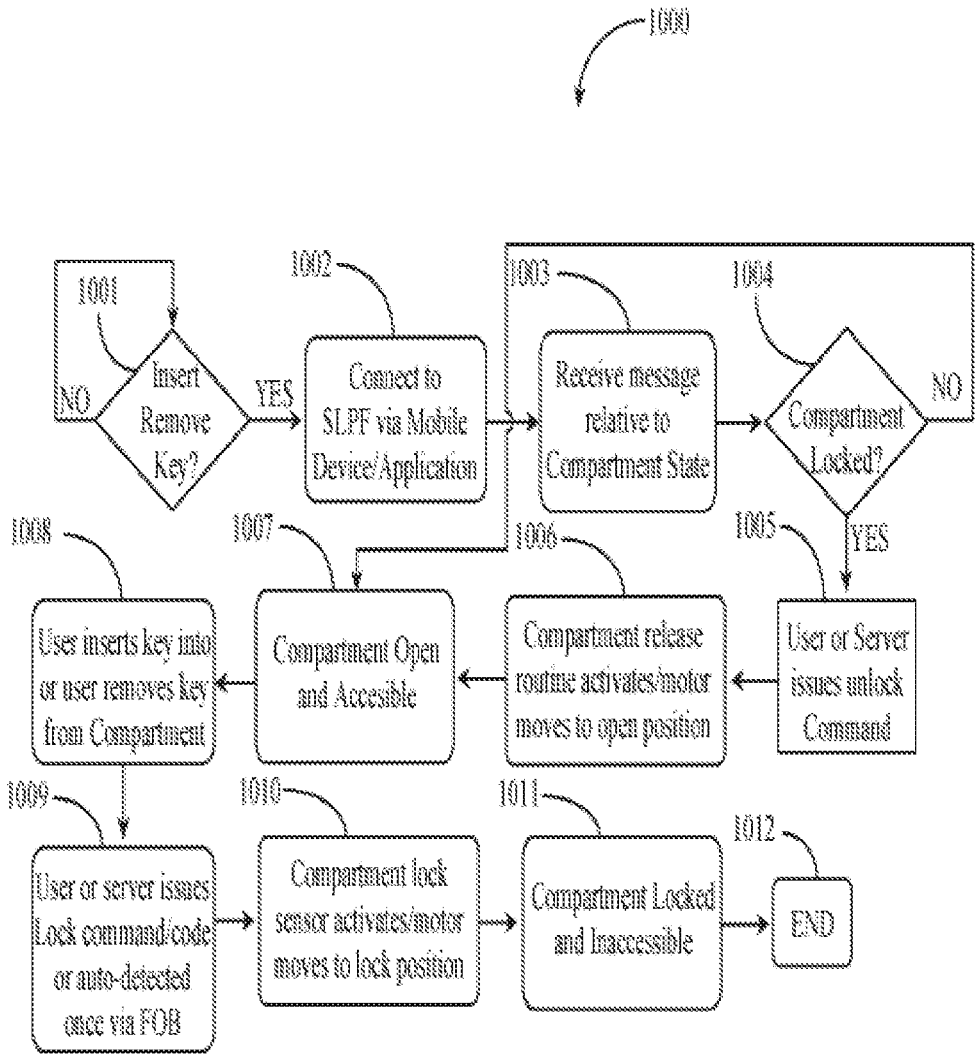
FIG. 10 is a process flow chart depicting steps for opening and closing the key compartment door for key insertion or removal according to an aspect of the present invention.

FIG. 10 is a process flow chart 1000 depicting steps for opening and closing the key compartment door for key insertion or removal according to an aspect of the present invention. At step 1001, a user may determine whether to access a key compartment on a SLPF in order to insert a key or keys into the compartment or to remove a key, keys or other item from the compartment. If the user determines not to access the key compartment, the process may loop back until a determination is made. If the user determines to access the key compartment, the process may move to step 1002 where the user may connect to the SLPF via the user's mobile communications device and SW application running thereon. Connection may mean simply walking into close range communication (such as, for example, Bluetooth™ range) of the device with the personal communications device on with the mobile application running. In another aspect, the user may have NFC capability and may receive information from SLPF when the user brings the personal communications device within NFC range. An NFC tag or card may also be used without departing from the spirit and scope of the present invention.

The user may receive a message from the SLPF relative to compartment door state (locked/unlocked). Presumably the key compartment door is locked whenever there is a key or FOB contained therein. However, in one case where the owner is to place a key in the vehicle, the compartment door may not be locked because no key is inside. Therefore, if a renter receives a message that the compartment is not locked, that may mean there is no key inside the compartment. At step 1004, the user determines whether the compartment door is locked. If the key compartment door is not locked at step 1004, the process may skip over to step 1007 where the compartment is open and accessible to the user.

If the user determines that the key compartment door is locked at step 1004, the user, or the server (on behalf of the user) may issue an access code or "unlock" command. The user may receive the access code from the server over a network connection between the server and the user's personal communications device running the mobile application. The user may then issue or "send" the command to the SLPF over the short range wireless connection established between the SLPF and the user's personal communications device. In an alternative embodiment, the server may, upon detecting that the correct user is at the location of the vehicle and is there to take the vehicle, work on the vehicle, or to put a key in the SLPF key compartment, give the access code directly from the server to the SLPF over a network connection between the server and the SLPF. Of course, both functions may be practiced such as for renters, the server unlocks the compartment and re locks the compartment. For owners, the server sends the code to the owner device where the owner may access the compartment using his personal device and a resident access code any time.

At step 1006, a key compartment release routine may be used to activate a motor to move a motor cam or aperture into a position to lock or unlock the key compartment door. For example, the access code may be sent to the SLPF via short wireless range or over the data network wherein SW (118) on the device matches the access code to data stored on the SLPF and, if correct, sends a signal to a sensor or mechanism adapted to toggle the motor to move to the unlock position. At step 1007, the compartment may be open and physically accessible to the user.

At step 1008, a user may insert a key or keys into or remove a key or keys from the key compartment. In this process, the user may close the key compartment door and then may issue or send a "lock" code or command at step 1009 to ensure that the motor has been triggered and has re-locked the compartment. Alternatively, the lock may be triggered automatically if a FOB is detected by sensors within the compartment. The server may also send a lock command to the SLPF on behalf of the user. In one embodiment, the compartment automatically "locks" whenever the compartment door is physically closed (auto lock) where the door may only be unlocked by a correct access code. It is noted also that in one aspect, an access code may be assigned to a user as long as the SLPF has the same information at the time of compartment access. For example, an access code may be digits, a password, a combination of digits and characters, a machine language not legible to humans, etc.

At step 1010 a lock sensor/receiver connected to a motor may activate the motor to move into a locking position. At step 1011, the key compartment is locked and is not accessible without issuing the correct access code or command. The process may end at step 1012. It is important to note herein that there may be sub-steps for accessing a locked key compartment that may vary in content and order depending upon the classification of user (owner/renter) without departing from the spirit and scope of the present invention. For example, an owner may have a resident access code that never changes or is only updated periodically whereas a renter may be assigned a temporary access code to access a specific vehicle.

Access codes that are assigned may also be time stamped and may have a limited time to live (TTL) before they are no longer valid. For example, a renter may be issued an access code to access a SLPF key compartment only when the renter is at the vehicle location and the renter may be required to immediately use the code to gain access to the key compartment. The code may be a one-time access code assigned to the renter and to the SLPF for one-time use. If a renter becomes a frequent renter of a same vehicle periodically or regularly such as in a commute to a job for example, the access code given to the renter may be the same code used by the owner as long as the SLPF recognizes the renter by the renter's personal communications device. In one aspect, the owner may send an access code to a "trusted" renter or "sharer" of the vehicle as well as providing it to third party "trusted" services adapted to serve specific needs such as cleaning a rental vehicle or maintaining it gas, etc. in the field. These events may be system procured or owner procured without departing from the spirit and scope of the present invention.

It will be apparent to one with skill in the art that the vehicle sharing system and apparatus of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A secure vehicle sharing system comprising:
    a computerized server connected to a network and executing software from memory;
    a computerized housing for securely mounting on an outside surface of a vehicle, including:
        an instance of the software executing from memory;
        Global Positioning System (GPS) capability;
        a locking compartment;
        an interface, accessible on the network, provided by the software on the server,
    enabling first users to register by uploading to a database, accessible to the server, at least
    identification of a computerized housing, identification of a vehicle, and user profile, and
    enabling second users to register by uploading user profile data to the database, including at least user identification;
    a computerized mobile client device available to at least the second user, the computerized mobile client device enabled for connection to the network, the client device storing and executing an instance of the software from memory and including Global Positioning System (GPS) capability;
    wherein the server receives a request from the second user's computerized mobile client device to access a vehicle, the server accesses the database and matches the request to one or more available registered vehicles, the server sends results of the matching to the second user's computerized mobile client device and the second user selects an available registered vehicle causing the server to send to the computerized mobile client device the vehicle location data enabling the second user to locate the selected registered vehicle associated with the first user, and security data is sent from the server to the computerized mobile client device when the second user is determined to be in immediate proximity of the registered vehicle via GPS enabling the second user to communicate the security data to the computerized housing via a near field communication (NFC) established between the computerized mobile client device and the computerized housing causing the housing to unlock the locking compartment allowing access to a key or other item stored in the locking compartment;

wherein the computerized housing further comprises at least an accelerometer enabling detection of one or more of shock, vibration, sound, and movement indicating the occurrence of an event including one or more of tampering with the housing, vehicle burglary, unauthorized movement of the vehicle, or collision of the vehicle, and the computerized housing is enabled to send data notifying any one of the server, the first and second users, third party, or other participating user of the event occurrence;

wherein the computerized housing further comprises one or more locking compartment sensors capable of detecting a key or other item held within the locking compartment; and wherein the computerized housing activates one or more of the accelerometer and key compartment sensors, locks the key compartment, and the mobile computerized client device of the user records a GPS location when the mobile computerized client device of the second user moves a distance away from the computerized housing such that the communication signal strength established between the mobile computerized client device of the second user and the computerized housing is diminished to a level indicating that the user has left the vehicle.

2. The system of claim 1, wherein the computerized housing is enabled to boost the short wave communication signal to the computerized mobile client device of the first and second users to communicate the occurrence of an event.

3. The system of claim 1 wherein the server tracks at least time, mileage and location of the selected registered vehicle during operation by the second user, via at least one of the computer housing's GPS or the GPS of the computerized mobile device of the second user, and upon completion of the vehicle operation, the second user replaces the key or other item in the locking compartment, and sends notification of completion of use of the selected vehicle to the server.

4. The system of claim 1, wherein the computerized housing includes a rectangular opening for securing and displaying a license plate of the vehicle the computerized housing is mounted to.

5. The system of claim 1, wherein the computerized housing includes sensors including any one or more of a digitized camera and microphone, and the occurrence of an event causes the computerized housing to send data from the any one or more of digitized camera and microphone to at least any one of the server, the first and second users user, third party, or other participating user.

6. The system of claim 1, wherein the computerized housing includes any one or more of a buzzer, speaker and light, any of which is activated by any one of the server, the first and second user, third party, or other participating user in response to receipt of data regarding the occurrence of an event.

7. A method for vehicle sharing including a computerized server connected to a network and executing software from memory, comprising the steps of:

(a) providing an interface of the network enabling a first user to register by uploading to a database, accessible to the server, at least identification of a computerized housing, identification of a vehicle and user profile, and enabling a second user to register by uploading user profile data to the database, including at least user identification;

(b) mounting the computerized housing to one or more registered vehicles, the computerized housing including Global Positioning System (GPS) capability;

(c) receiving a request at the server from an instance of the software executing from memory of a second user's mobile computerized client device including Global Positioning System (GPS) capability, the server accessing the database and matching the request to one or more available registered vehicles within a geographical area of the second user as determined by GPS, sending data matching results to the user's mobile computerized client device;

(d) receiving the data matching results at the computerized mobile client device of the user, enabling the user to select an available registered vehicle, causing the server to respond to the selection by providing location data of the selected registered vehicle to the computerized mobile client device of the user;

(e) sending security data to the computerized mobile client device of the user by the server when it is determined via GPS that the second user and the computer housing are in immediate proximity;

(f) sending the security data from the computerized mobile client device to the computerized housing mounted on the selected registered vehicle, via a near field communication (NFC) established between the computerized mobile client device and the computerized housing, the data received by an instance of the software executing from memory of the computerized housing and causing unlocking of a locking compartment in the computerized housing enabling access to a key or other item for operating the vehicle; and (g) activating one or more of an accelerometer and key compartment sensors, locking the key compartment, and recording a GPS location when the mobile computerized client device of the second user moves a distance away from the computerized housing such that the communication signal strength established between the mobile computerized client device of the user and the mobile computerized security housing is diminished to a level indicating that the user has left the vehicle.

8. The method of claim 7, further comprising the step of boosting the short wave communication signal to the computerized mobile client device of the second user to communicate the occurrence of an event.

9. The method of claim 7, further comprising the steps of tracking at least time, mileage and location of the selected registered vehicle during operation by the second user, via a Global Positioning System (GPS), and when the user replaces the key or other item in the locking compartment upon completion of the vehicle operation, sending notification of completion to the server via the instance of software on the computerized mobile client device and the server.

10. The method of claim 7, wherein the computerized housing includes a rectangular opening for securing and displaying a license plate of the vehicle the computerized housing is mounted to.

11. The method of claim 7, wherein further comprising the step of wherein the computerized housing further comprises locking compartment sensors capable of detecting a key or other item stored within the locking compartment.

12. The method of claim 7, wherein the computerized housing comprises at least an accelerometer enabling detection of one or more of shock, vibration, sound, and movement indicating the occurrence of an event including one or more of tampering with the housing, vehicle burglary, unauthorized movement of the vehicle, or collision of the vehicle, and the computerized housing is enabled to send data notifying any one of the server, the first and second users user, third party, or other participating user of the event occurrence.

13. The method of claim 7, wherein the computerized housing includes sensors including any one or more of a digitized camera and microphone, and the occurrence of an event causes the computerized housing to send data from the any one or more of digitized camera and microphone to at least any one of the server, the first and second users user, third party, or other participating user.

14. The method of claim 7, wherein the computerized housing includes any one or more of a buzzer, speaker and light, any of which is activated by any one of the server, the first and second users user, third party, or other participating user in response to receipt of data regarding the occurrence of an event.

15. An apparatus for secure vehicle sharing comprising:
a computerized housing for securely mounting on an outside surface of a vehicle, including:
an instance of software executing from memory;
a locking compartment;
locking compartment sensors capable of detecting a key or other item stored within the locking compartment;
Global Positioning System (GPS) capability;
short wave communication capability for communicating with a user's mobile computerized client device;
an interface, accessible by a user utilizing a mobile computerized client device in wireless communication with the apparatus;
an accelerometer enabling detection of one or more of shock, vibration, sound, and movement indicating the occurrence of an event including one or more of tampering with the housing, vehicle burglary, unauthorized movement of the vehicle, or collision of the vehicle, and the computerized housing is enabled to send data to the user, a server, or third party of the event occurrence; and
wherein the computerized housing activates the accelerometer and locking key compartment sensors locks the key compartment, and records a GPS location when the mobile computerized client device of the user moves a distance away from the computerized housing such that the communication signal strength established between the mobile computerized client device and the computerized housing is diminished to a level indicating that the user has left the vehicle.

16. The apparatus of claim 15, wherein the computerized housing is enabled to boost the short wave communication signal to the computerized mobile client device of the user to communicate the occurrence of an event.

17. The apparatus of claim 15, wherein the computerized housing includes a rectangular opening for securing and displaying a license plate of the vehicle the apparatus is mounted to.

18. The apparatus of claim 15, wherein the computerized housing includes sensors including any one or more of a digitized camera and microphone, and the occurrence of an event causes the computerized housing to send data from the any one or more of digitized camera and microphone to at least any one of the server, the first and second users user, third party, or other participating user.

19. The apparatus of claim 15, wherein the computerized housing includes any one or more of a buzzer, speaker and light, any of which is activated by any one of the server, the first and second users user, third party, or other participating user in response to receipt of data regarding the occurrence of an event.

* * * * *